US011443276B2

(12) United States Patent
Brooks et al.

(10) Patent No.: US 11,443,276 B2
(45) Date of Patent: Sep. 13, 2022

(54) DYNAMIC FLEX-SPACE ALLOCATION SYSTEM

(71) Applicant: WALMART APOLLO, LLC, Bentonville, AR (US)

(72) Inventors: Cristy Crane Brooks, Cassville, MO (US); David Blair Brightwell, Bentonville, AR (US); Benjamin D. Enssle, Bella Vista, AR (US); Greg Bryan, Bentonville, AR (US); Jesse Lee Eaton, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 631 days.

(21) Appl. No.: 16/231,417

(22) Filed: Dec. 22, 2018

(65) Prior Publication Data

US 2019/0236528 A1 Aug. 1, 2019

Related U.S. Application Data

(60) Provisional application No. 62/622,828, filed on Jan. 27, 2018.

(51) Int. Cl.
*G06Q 10/08* (2012.01)
*G06Q 50/28* (2012.01)
(Continued)

(52) U.S. Cl.
CPC ....... *G06Q 10/087* (2013.01); *G06K 7/10386* (2013.01); *G06K 7/10881* (2013.01); *G06N 20/00* (2019.01); *G06Q 10/06315* (2013.01)

(58) Field of Classification Search
CPC .......... G06Q 10/087; G06Q 10/06315; G06N 20/00; G06K 7/10386; G06K 7/10881
See application file for complete search history.

(56) References Cited

U.S. PATENT DOCUMENTS 7,949,568 B2 * 5/2011 Fano .................... G06Q 20/203
 705/28
8,271,330 B2 * 9/2012 Brignull ................ G06Q 30/04
 715/706

(Continued)

OTHER PUBLICATIONS

Sachin Chaudhary, A real-time fine-grained visual monitoring system for retail store auditing, Dec. 1, 2017, 2017 Fourth International Conference on Image Information Processing (ICIIP) (pp. 1-6).*

(Continued)

*Primary Examiner* — Talia F Crawley

(57) ABSTRACT

Examples provide a system for dynamic allocation of supplemental space to items based on predicted variable demand. Item data is analyzed using a set of item selection criteria to identify an item located within a predetermined distance of available flex-space associated with a topstock shelf which has a predicted time-supply predicted to be less than a threshold time-supply during a predicted time-period. A portion of flex-space sufficient to increase the time-supply enough to meet the predicted increase in demand is identified. Additional instances of the item are assigned to the portion of the flex-space during the predetermined time-period. When an expiration date for the flex-space assignment occurs, remaining instances of the item in the portion of the flex-space are removed. The portion of the flex-space is assigned to a next item predicted to experience temporary context-dependent increased demand exceeding time-supply and/or capacity of permanent display space of the item.

6 Claims, 13 Drawing Sheets

(51) Int. Cl.
  *G06Q 10/06* (2012.01)
  *G06K 7/10* (2006.01)
  *G06N 20/00* (2019.01)

(56) References Cited

U.S. PATENT DOCUMENTS

| | | | | |
|---|---|---|---|---|
| 2006/0071774 | A1* | 4/2006 | Brown | G07F 9/026 340/522 |
| 2007/0016494 | A1* | 1/2007 | Brown | G06Q 10/087 705/28 |
| 2008/0306787 | A1* | 12/2008 | Hamilton | G06Q 10/0639 705/7.38 |
| 2009/0059270 | A1* | 3/2009 | Opalach | G06K 9/00 358/1.15 |
| 2009/0060349 | A1* | 3/2009 | Linaker | G06Q 20/203 382/209 |
| 2009/0063306 | A1* | 3/2009 | Fano | G06Q 20/203 705/28 |
| 2009/0063307 | A1* | 3/2009 | Groenovelt | G06Q 10/087 705/28 |
| 2011/0035257 | A1* | 2/2011 | Solanki | G06Q 10/043 705/7.31 |
| 2012/0133623 | A1* | 5/2012 | Byun | G09G 3/20 345/207 |
| 2012/0323620 | A1* | 12/2012 | Hofman | G06Q 10/087 705/7.11 |
| 2014/0025420 | A1* | 1/2014 | Joshi | G06Q 10/06313 705/7.23 |
| 2015/0112762 | A1* | 4/2015 | Lahmar | G06Q 30/0202 705/7.31 |
| 2016/0255969 | A1* | 9/2016 | High | H04W 4/30 |
| 2017/0091704 | A1* | 3/2017 | Wolf | G06Q 10/043 |
| 2017/0286773 | A1* | 10/2017 | Skaff | H04N 5/23238 |
| 2017/0330139 | A1* | 11/2017 | Jones | G06Q 10/087 |
| 2018/0293543 | A1* | 10/2018 | Tiwari | G05D 1/0274 |
| 2019/0188782 | A1* | 6/2019 | Howard | G06Q 30/0639 |
| 2019/0236527 | A1* | 8/2019 | Bhaumik | G06Q 10/087 |
| 2021/0042502 | A1* | 2/2021 | Adato | G06Q 20/203 |

OTHER PUBLICATIONS

M. Marder et al, Mar. 1, 2015,IBM Journal of Research and Development (vol. 59, Issue: 2/3, pp. 3:1-3:11).*

Young, Lee W., "International Search Report", International Application No. PCT/US2018/067405, dated Mar. 27, 2019, 2 pages.

Young, Lee W., "Written Opinion", International Application No. PCT/US2018/067405, dated Mar. 27, 2019, 5 pages.

Unknown, "Product Assortment: Your Competitive Advantage", Right Product Assortment Planning / Intelligence Node, http://www.intelligencenode.com/knowledge/product-assortment-planning-retail/, captured Sep. 25, 2017, 3 pages.

* cited by examiner

DYNAMIC FLEX-SPACE ALLOCATION SYSTEM

BACKGROUND

Items in a store are typically assigned to one or more display areas on a shelf, counter, refrigerated unit, freezer unit, end-cap, display cabinet, or other location. The items may be stacked one in front of the other, as well as one item on top of another within the display to maximize the number of items available within that space. However, interest in an item may increase or decrease based on seasons, holidays, events, and/or changes in weather. For example, interest in umbrellas is typically greater when rainfall increases or when the weather forecast predicts rain is expected. This varying demand for certain items frequently leads to an insufficient number of items available on the regular item displays, an increased frequency of restocking the assigned display areas, and/or insufficient number of items available on the assigned display area.

SUMMARY

Some examples of the disclosure provide a system for dynamic allocation of items to temporary display space within an item display area. The system includes a memory, at least one processor communicatively coupled to the memory, and a plurality of sensor devices within the item display area. A topstock management component analyzes sensor data generated by the plurality of sensor devices. The topstock management component identifies available flex-space associated with at least one topstock shelf within the item display area based on the analysis of the sensor data. An item management component calculates a per-item capacity associated with a permanent display area assigned to a selected item having variable demand during a predetermined time-period. A capacity prediction component calculates a predicted per-item capacity associated with the selected item during the predetermined time-period. The predicted per-item capacity is calculated using item data, historical transaction data, and context data associated with the item display area. A flex-space allocation component assigns a portion of the available flex-space to the selected item if the predicted capacity exceeds the calculated per-item capacity as a supplemental display area for one or more instances of the selected item during the predetermined time-period.

Other examples provide a computer-implemented method for dynamic allocation of supplemental space to items. A topstock management component identifies available flex-space for a selected topstock shelf within an item display area. The flex-space includes a three-dimensional open space associated with at least a portion of the selected topstock shelf. An item selection component analyzes item data and a planogram associated with a plurality of items within the item display area using a set of item selection criteria. The item selection component identifies an item within the item display area assigned to at least one permanent display located within a predetermined distance from the topstock shelf. A capacity prediction component calculates a time-supply for the identified item based on context data associated with the item display area and transaction data associated with the identified item. A flex-space allocation component assigns one or more instances of the identified item to the flex-space for a predetermined time-period if a per-item threshold minimum time-supply for the identified item exceeds the calculated time-supply.

Still other examples provide a system for dynamic allocation of supplemental space to items. The system includes a memory; at least one processor communicatively coupled to the memory; and a plurality of sensor devices associated with an item display area. A topstock management component analyzes sensor data generated by the plurality of sensor devices and identifies available flex-space associated with at least one topstock shelf within the item display area based on the analysis. The available flex-space includes a length, width, and height dimensions of an open space associated with a topstock shelf. An item selection component identifies a set of items from a plurality of items within the item display area suitable for placement within the available flex-space based on dimensions of each item in the set of items and a location of a at least one permanent display area assigned to each item in the set of items. Each item in the set of items is an item having variable demand and assigned to a permanent display area located within a predetermined distance of the available flex-space. A capacity prediction component calculates a predicted number of item-outs associated with each item in the set of items during a predetermined time-period using per-item current capacity of the assigned permanent display area and a predicted per-item time-supply for each item. An item-out includes an absence of items available on the assigned permanent display area triggering a restock of the selected item. A flex-space allocation component selects an item from the set of items having the predicted number of item-outs exceeding a threshold number of item-outs and assigns at least a portion of the available flex-space to the selected item as a supplemental display area for one or more instances of the selected item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a system for dynamic flex-space allocation to items based on predicted capacity requirements and/or per-item predicted time-supply. The system enables more accurate prediction of the amount of display space necessary to meet predicted demand for a selected item while reducing frequency of restocking shelves. This decreases item-outs and improves efficiency of display space utilization.

Figure 1:
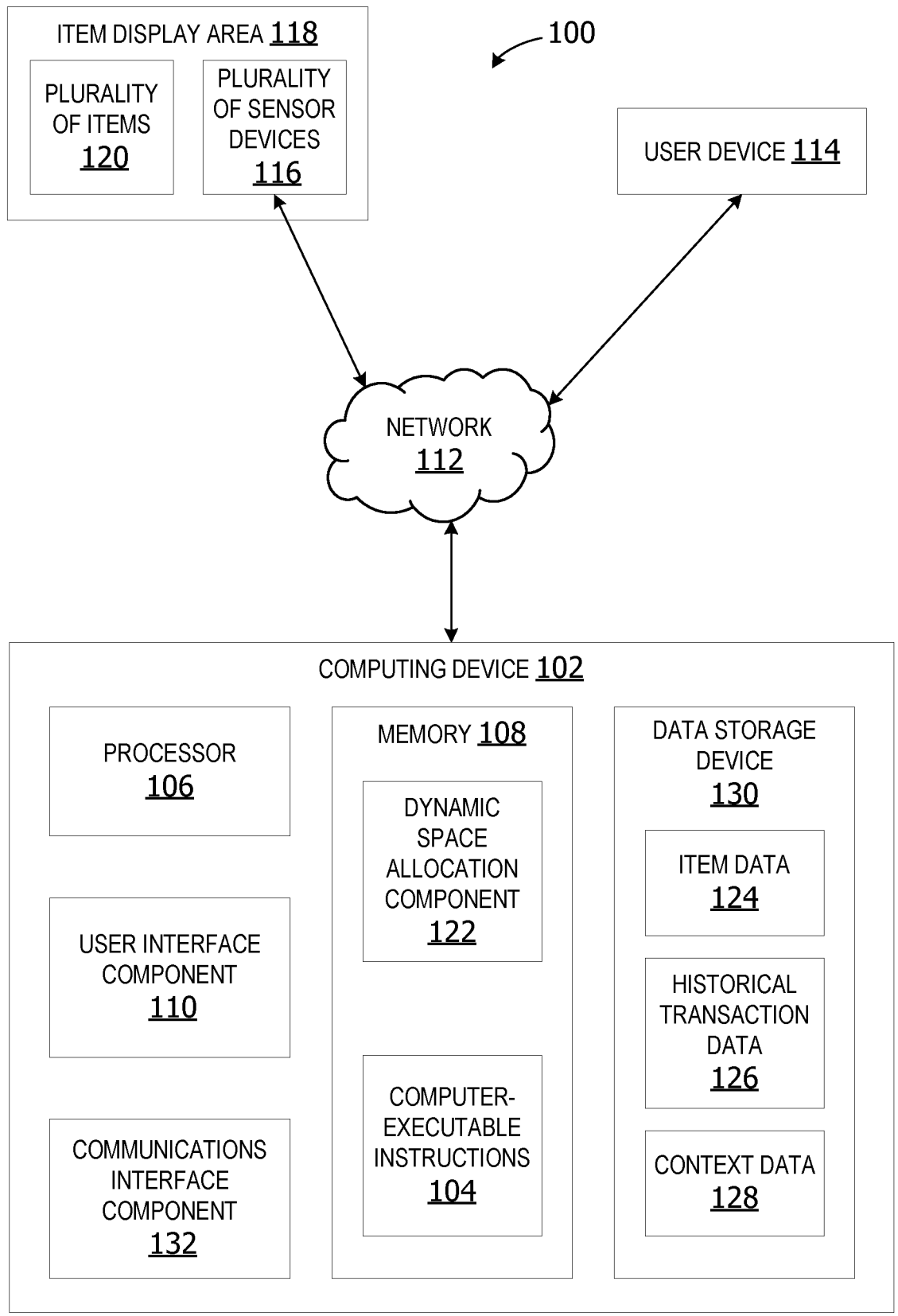
FIG. 1 is an exemplary block diagram illustrating a system for dynamically allocating temporary display space to items based on per-item predicted time-supply.

Referring again to FIG. 1, an exemplary block diagram illustrates a system 100 for dynamically allocating temporary display space to items based on per-item predicted time-supply. In the example of FIG. 1, the computing device 102 represents any device executing computer-executable instructions 104 (e.g., as application programs, operating system functionality, or both) to implement the operations and functionality associated with the computing device 102.

The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106, a memory 108, and at least one user interface component 110. The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 17, FIG. 18 and FIG. 19).

The computing device 102 further has one or more computer readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. For example, the applications can represent downloaded client-side applications that correspond to server-side services executing in a cloud.

In some examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH™ brand communication module, global positioning system (GPS) hardware, and a photoreceptive light sensor. For example, the user can input commands or manipulate data by moving the computing device 102 in various ways.

The network 112 is implemented by one or more physical network components, such as, but without limitation, routers, switches, network interface cards (NICs), and other network devices. The network 112 can be any type of network for enabling communications with remote computing devices, such as, but not limited to, the user device 114 and/or a plurality of sensor devices 116 associated with an item display area 118. The network 112 can include a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

The user device 114 is implemented as any device executing computer-executable instructions. The user device 114 can be implemented as a mobile computing device, such as, but not limited to, a wearable computing device, a mobile telephone, laptop, tablet, computing pad, netbook, gaming device, and/or any other portable device. The user device 114 includes at least one processor and a memory. The user device 114 can also include a user interface component.

The plurality of sensor devices 116 includes sensor devices for generating sensor data associated with a plurality of items 120 displayed within the item display area 118. The plurality of sensor devices 116 can include, without limitation, one or more image capture device(s), radio frequency identifier (RFID) tag reader(s), barcode scanner(s), universal product code (UPC) readers, quick response (QR) code readers, matrix barcode readers, robotic sensor device(s), pressure sensor(s), weight sensor(s), photosensor(s), and/or handheld scanner device(s).

In some examples, the plurality of sensor devices 116 includes one or more hand-held sensor devices, one or more sensor devices mounted on a fixture and/or sensor devices integrated within a set of shelves. A fixture can include, without limitation, a wall, the ceiling, a door, an unmovable shelf, etc. Thus, a sensor device can be mounted to the ceiling, mounted to the wall, mounted to a door, mounted to a shelf, mounted to a point-of-sale (POS) device, or mounted anywhere else.

The sensor devices in other examples includes an autonomous robotic sensor device. A robotic sensor device is implemented as one or more sensor devices integrated into a robot capable of autonomous movement, pre-programmed movement, and/or remote-control movement. The robot(s) can include robotic sensor device(s) capable of moving along a floor or on a track and/or drones.

The item display area 118 is a public or semi-public shopping area including the plurality of items 120 available for purchase by users. The item display area 118 can include an interior portion of a store, an exterior area, or any other area including the plurality of items 120. The plurality of items 120 can be displayed on one or more display areas, such as, but not limited to, a shelf, an end-cap, a refrigerated display case, a freezer, a heated display case, or any other type of display.

The memory 108 further stores a dynamic space allocation component 122 that, when executed by the processor 106 of the computing device 102, causes the processor 106 to identify available flex-space associated with a selected topstock shelf within the item display area 118. A topstock shelf is an uppermost shelf or top shelf on a sales floor. The topstock shelf is typically out-of-reach to a user standing on the floor without assistance from a step-ladder or another tool. The flex-space includes a three-dimensional space unoccupied by any items. The flex-space is dynamically configurable space on at least a portion of one or more topstock shelves.

In some examples, the dynamic space allocation component 122 analyzes sensor data generated by the plurality of sensor devices associated with one or more topstock shelves to determine the location of available flex-space and the amount of available flex-space on topstock shelves. The sensor data is data such as, but not limited to, the sensor data 236 in FIG. 2. This enables assignment of items to available space that will fit within the available space to avoid wasting time and effort bringing items from storage that don't fit in the available flex-space.

The dynamic space allocation component 122 analyzes item data 124 associated with the plurality of items 120 within the item display area 118 to identify an item having a predicted time-supply that is less than a threshold minimum time-supply for the identified item. A time-supply is an amount of time between restocking permanent display areas assigned to a given item.

In some examples, the dynamic space allocation component 122 calculates the predicted time-supply for an item based on an analysis of the item data 124, the historical transaction data 126 associated with the identified item, and/or the context data 128 associated with the item display area 118. The dynamic space allocation component 122 in these examples assigns at least a portion of available flex-space to the identified item for a predetermined time-period.

The system 100 optionally includes a data storage device 130. The data storage device 130 can include one or more types of data storage devices, such as, for example, one or more rotating disks drives, one or more solid state drives (SSDs), and/or any other type of data storage device. The data storage device 130 in some non-limiting examples includes a redundant array of independent disks (RAID) array. In other examples, the data storage device 130 includes a database.

The data storage device 130 in this example is incorporated within the computing device 102. In other examples, the data storage device 130 includes a remote data storage device accessed by the computing device via the network 112, such as a data storage at a data center or backup storage device. In other examples, the data storage device 130 is a cloud storage.

In some examples, the system 100 includes a communications interface component 132. The communications interface component 132 includes a network interface card and/or computer-executable instructions (e.g., a driver) for operating the network interface card. Communication between the computing device 102 and other devices, such as, but not limited to, the user device 114 and/or the plurality of sensor devices 116 can occur using any protocol or mechanism over any wired or wireless connection. In some examples, the communications interface component 132 is operable with short range communication technologies such as by using near-field communication (NFC) tags.

The data storage device 130 in some examples stores data for flex-space allocation by the dynamic space allocation component 122. The data can include the item data 124, the historical transaction data 126, and/or the context data 128. The item data 124 is data describing an item. The item data 124 can include item dimensions (length, width, and height), item weight, indicate whether the item is fragile, identify the number of items per case, dimensions of one case of the items, etc.

The historical transaction data 126 includes data associated with items transactions associated with a plurality of items during a predetermined past time-period. The historical transaction data 126 can be generated by a plurality of point-of-sale (POS) devices associated with one or more different stores and/or locations. The historical transaction data 126 can include number of items sold during a given time-period, seasonality of an item, peak demand times, low demand times, etc.

Context data 128 is data associated with the item display area. The context data 128 can include current and/or predicted weather forecasts, current date, season, upcoming holidays, local events, national events, etc. The context data 128 can be obtained from data feeds, user-input, and/or from sensor data generated by the plurality of sensor devices 116. The context data 128 can be received from one or more remote computing device in other examples via the network 112.

The dynamic space allocation component 122 utilizes the transaction data, item data, context data, and/or inventory data to optimize storage/placement of items in flex-space associated with one or more topstock shelves. The dynamic space allocation component 122 identifies available flex-space in some examples by analyzes sensor data generated by sensor devices associated with the one or more topstock shelves. The sensor data can include, for example, image capture data providing image(s) of the one or more topstock shelves. The dynamic space allocation component 122 determines if one or more items or cases of a given item will fit in the available flex-space.

In some examples, if on-hand inventory of an item is less than the capacity of the permanent display shelves assigned to the item, the dynamic space allocation component 122 assigns all the on-hand inventory to the permanent display shelves. If the on-hand inventory is greater than the capacity of the permanent display, the dynamic space allocation component 122 analyzes the item data, inventory data, transaction data, and/or context data to determine whether to assign supplemental display space to the item from the flex-space associated with one or more topstock shelves.

In this manner, the dynamic space allocation component 122 utilizes the inventory of all items to determine which items should be allocated supplemental display space on topstock shelves, how many instances of each item to place on the topstock shelves, and/or how long flex-space should be assigned to each item. The flex-space on one or more topstock shelves is utilized by the dynamic space allocation component 122 eliminate/reduce out-of-stocks; increase ease of filling side-counter shelves/displays with items from nearby topstock locations; drive perpetual inventory (on-hand inventory) more accurately; reduce time and labor spent restocking permanent display areas (back and forth to backroom storage space); and/or utilize backroom storage space for efficiently. The side-counter refers to a set of shelves on either side of an aisle. A side-counter or portion of a side-counter can include a modular home/permanent display area for an item. A modular in some examples includes a four-foot space planogram associated with an item.

Figure 2:
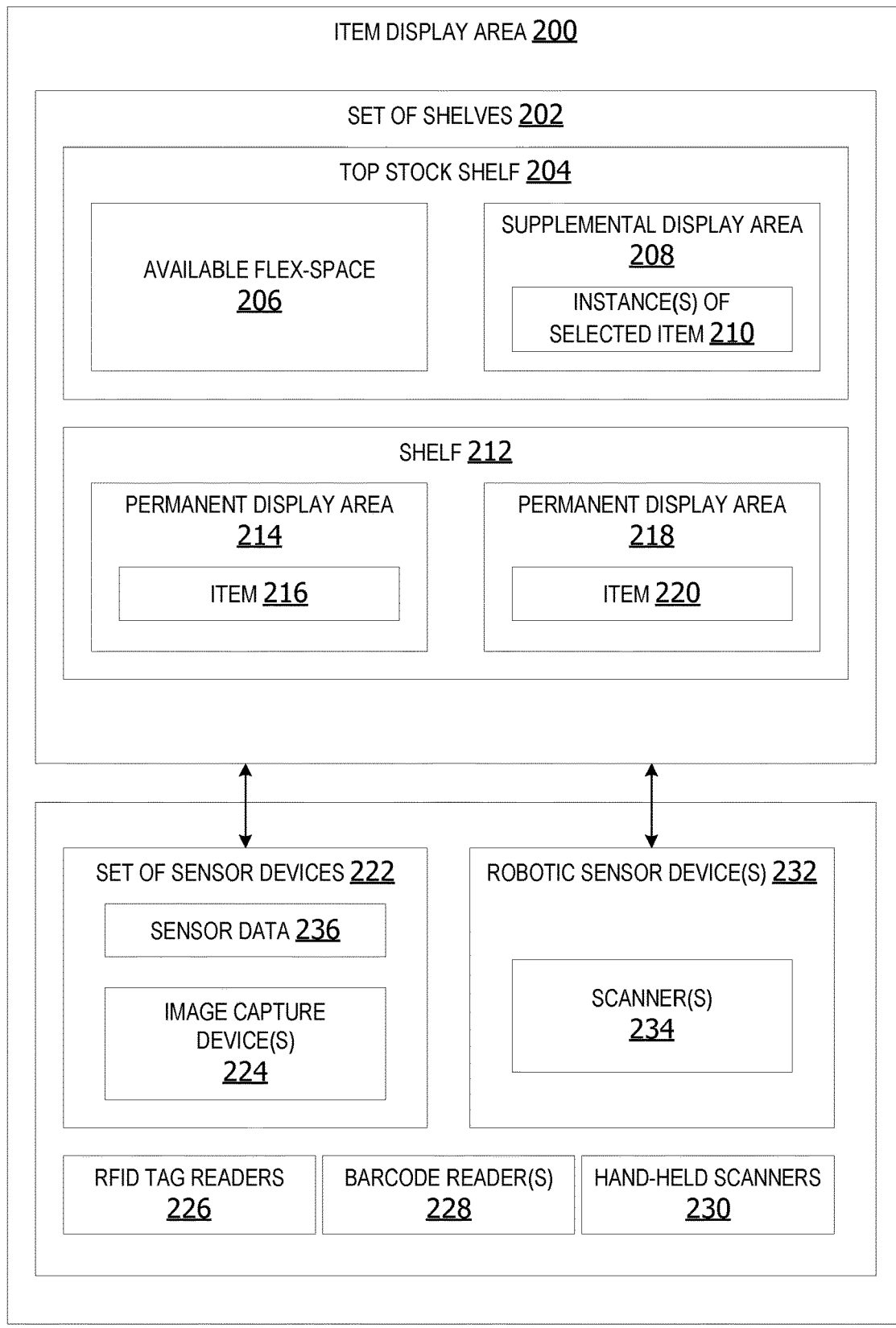
FIG. 2 is an exemplary block diagram illustrating an item display area.

FIG. 2 is an exemplary block diagram illustrating an item display area 118. The item display area 118 includes a set one or more shelves 202. The set of shelves 202 includes at least one topstock shelf 204. The topstock shelf 204 is an uppermost shelf in the set of shelves 202. The topstock shelf 204 includes available flex-space 206. The available flex-space 206 is an amount of unoccupied space available for assignment as supplement display space for one or more other items.

The topstock shelf 204 can include supplemented display area 208 displaying/storing one or more instance(s) of a selected item 210. The supplemented display area 208 is space on the topstock shelf 204 occupied by the one or more instances of the selected item 210. For example, if the selected item is an over-the-counter allergy medication expected to increase in sales during allergy season, an additional case of the allergy medication can be stored in supplemental display space on one or more topstock shelves throughout allergy season in the Spring and/or Fall for convenient access by users. When the permanent display space on a lower shelf is depleted, a user refills the lower-shelf with the additional instances of the selected item 210 located on the topstock shelf.

In one example, allergy season begins in March or April and ends in May or early June. Supplemental space for allergy-related items is allocated from March until June. At the end of allergy season, the supplemental display space is re-assigned to a different item, such as sunscreen or sunglasses expected to increase in demand during the summer months.

The set of shelves 202 includes one or more lower shelves, such as the shelf 212. The shelf 212 includes one or more permanent display areas, such as the permanent display area 214 displaying one or more instances of a first item 216 and/or the permanent display area 218 displaying one or more instances of a second item 220.

In some examples, the topstock shelf 204 provides additional display space for items located on the same set of shelves 202. For example, if the item 220 is body wash, additional instances of the body wash can be stored/displayed in the available flex-space 206 for quick access if the supply of body wash bottles on the shelf 212 is depleted. This enables replenishment of the body wash on the shelf 212 from the topstock shelf 204 without going back to a storeroom or backroom to obtain more bottles of the body wash for restocking.

In another example, if cans of beans are assigned to the permanent display area 214 and the supplemental display area 208, the shelf 212 can be restocked with additional cans of beans from the topstock shelf 204 whenever the number of cans on the shelf 212 falls below a threshold number or there is an item out associated with the cans of beans. This enables a user to replenish the shelf 212 without going to a backroom/stockroom for additional instances of the canned beans. The supplemental display area enables faster replenishment of shelves while saving time and reducing the number of trips users make to the backroom for restocking tasks.

A set of one or more sensor devices 222 monitors the number of items on the set of shelves 202, including the topstock shelf 204, such as, but not limited to, the plurality of sensor devices 116 in FIG. 1. The set of one or more sensor devices 222 can include, without limitation, such as but not limited to, one or more image capture device(s) 224, RFID tag reader(s) 226, barcode reader(s) 228, hand-held scanner(s) 230, and/or robotic sensor device(s) 232. The robotic sensor device(s) can include one or more scanner(s) 234 for scanning barcodes, RFID tags, UPC codes, matrix barcode, QR codes, and/or any other type of item identifiers.

The set of sensor devices 222 generate sensor data 236 associated with the set of shelves 202 and/or items on the set of shelves 202, such as the instance(s) of the selected item 210, the time(s) 216 and/or the item(s) 220.

Figure 3:
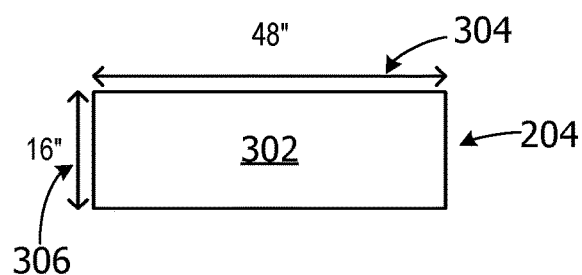
FIG. 3 is an exemplary block diagram illustrating a top view of an empty topstock shelf.

FIG. 3 is an exemplary block diagram illustrating a top view of an empty topstock shelf 204. The topstock shelf 204 includes a surface 302 on which one or more items can be placed. An item can be a single unit of an item or a case containing multiple units of an item.

The topstock shelf has a length 304 and a width 306. In this non-limiting example, the shelf length is forty-eight inches with a shelf width of sixteen inches. However, a topstock shelf is not limited to these dimensions. In other examples, the shelf length may be longer or shorter than 48 inches. Likewise, the shelf width can be greater or less than sixteen inches. For example, the shelf can be forty inches long by eighteen inches wide or any other suitable measurements.

Figure 4:
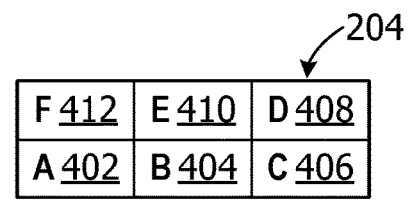
FIG. 4 is an exemplary block diagram illustrating an assignment grid associated with an empty topstock shelf.

FIG. 4 is an exemplary block diagram illustrating an assignment grid associated with an empty topstock shelf 204. In some examples, available space on a topstock shelf 204 is subdivided into a grid. One or more items are assigned to each available grid.

In this example, the topstock shelf 204 is subdivided into grid "A" 402, grid "B" 404, grid "C" 406, grid "D" 408, grid "E" 410, and grid "F" 412. One item can be assigned to the space associated with grid "A" 402 and grid "B" 404. And another item can be assigned to grid "F" 412.

Figure 5:
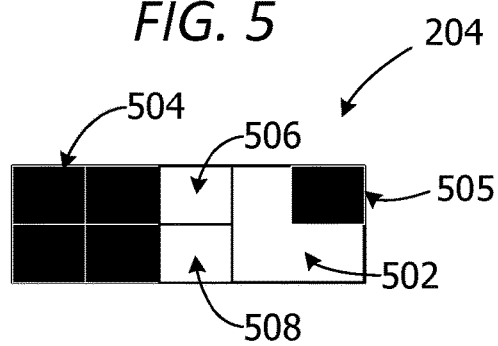
FIG. 5 is an exemplary block diagram illustrating a top view of a topstock shelf having a portion of the topstock shelf available.

FIG. 5 is an exemplary block diagram illustrating a top view of a topstock shelf 204 having a portion of the topstock shelf available. The portion of available flex-space 502 is three-dimensional space unoccupied by one or more items. In other words, the portion of the available flex-space is space that is not yet assigned to display any items. The portion of the available flex-space 502 is a space having a length, width and height.

The length and width in some examples includes the length and width of the topstock shelf. In other examples, the length and width of the available space is less than the length and width of the topstock if one or more items are already occupying a portion of the topstock shelf.

The height of the available flex-space can be the height from the surface of the topstock shelf to a ceiling of the item display area. In other examples, the height of the available space is the height from the surface of the topstock shelf to a predetermined point between the ceiling and the surface of the topstock shelf.

The portion of the unavailable flex-space 504 and 505 are three-dimensional spaces already occupied by one or more items. The portion of the unavailable flex-space 504 is assigned to display/store one or more instances of one or more items.

The topstock shelf can have multiple layers of horizontal space permitting one item to be placed in front of another item or behind another item. In some examples, items are placed on the front-facing row nearest the edge of the shelf first to increase visibility of the items labels. When the first row nearest the front is full, items are then placed further back, behind the first row to maximum the number of items facings visible to users standing in front of the shelf. Thus, even if a first row of a shelf is full, there can be available space behind the front row of items. For example, the item 506 is placed behind item 508. Item 508 in this example is a front-facing item visible to a user facing the topstock shelf 204. The item 506 is not visible to a user facing the topstock shelf.

Figure 6:
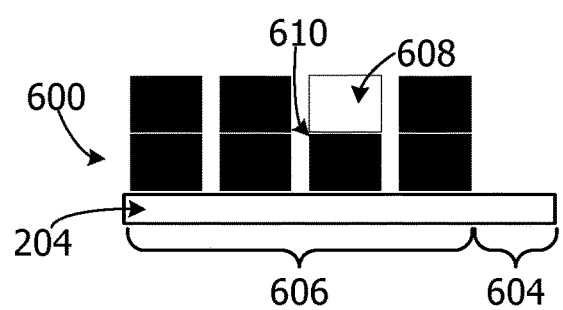
FIG. 6 is an exemplary block diagram illustrating a front view of a topstock shelf having a portion of space available.

FIG. 6 is an exemplary block diagram illustrating a front view 600 of a topstock shelf 204 having a portion of space available 604. The space available is unoccupied space. The portion of unavailable space 606 is topstock shelf space that is currently occupied or assigned to one or more items.

The topstock shelf can have multiple layers of vertical space available for stacking items. Even if one item is placed on the surface of the topstock shelf, there can be available space above the item. In other words, one item can be stacked on top of another item on the topstock shelf. For example, item 608 is stacked on top of item 610.

Figure 7:
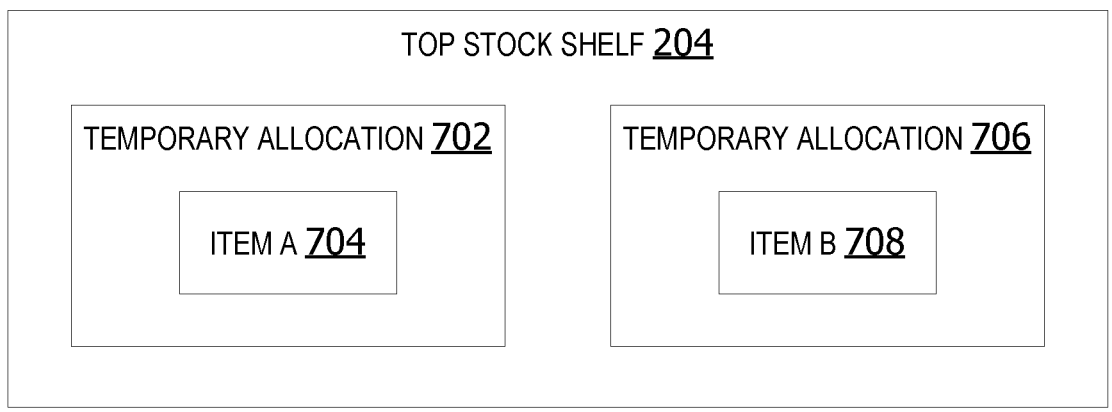
FIG. 7 is an exemplary block diagram illustrating a set of items assigned to a topstock shelf.

FIG. 7 is an exemplary block diagram illustrating a set of items assigned to a topstock shelf 204. The topstock shelf 204 in this example includes a temporary location 702 for an item "A" 704 and a temporary location 706 for an item "B" 708.

Figure 8:
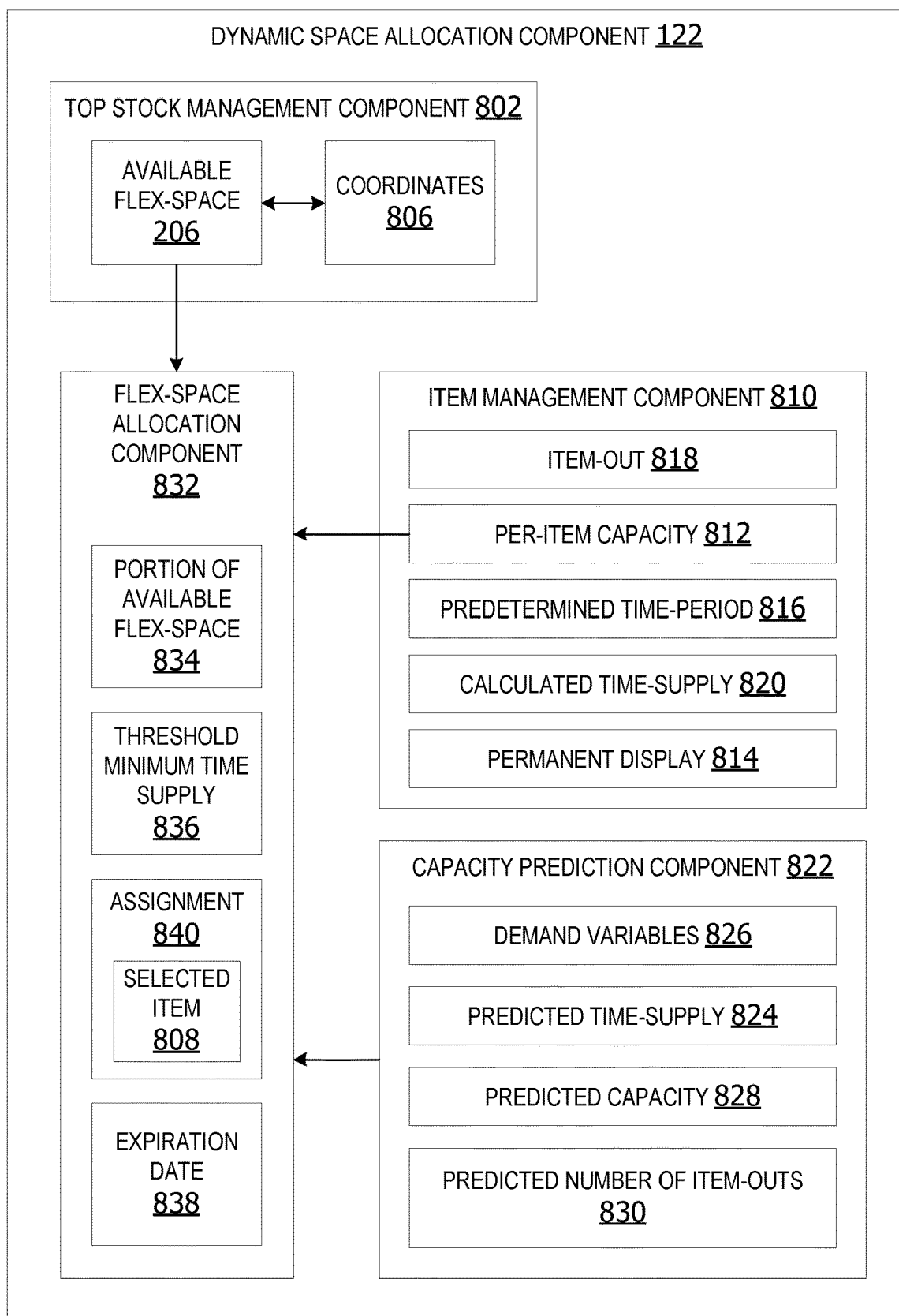
FIG. 8 is an exemplary block diagram illustrating a dynamic space allocation component.

FIG. 8 is an exemplary block diagram illustrating a dynamic space allocation component 122. A topstock management component 802 analyzes sensor data generated by a plurality of sensor devices, such as, but not limited to, the plurality of sensor devices 116 in FIG. 1 and/or the set of sensor devices 222 in FIG. 2. The topstock management component 802 identifies available flex-space 206 associated with at least one topstock shelf within the item display area, such as the topstock shelf 204 in FIG. 2, FIG. 3, FIG. 4, FIG. 5, FIG. 6 and/or FIG. 7.

The topstock management component 802 identifies available flex-space based on the analysis of the sensor data to identify items currently occupying space on the shelf and/or unoccupied space on the shelf. The topstock management component 802 utilizes coordinates 806 to identify the available flex-space and/or assign item(s) to the available flex-space.

The coordinates 806 can include length, width, and height dimensions of the available flex-space 206 of the topstock shelf. In other examples, the coordinates include GPS coordinates. The coordinates 806 in other examples include an aisle identifier, a shelf identifier, a length indicator, a width indicator, and a height indicator defining a three-dimensional space for placement of a set of items or a set of cases of items assigned to the flex-space.

In still another example, the coordinates include grid identifiers. A grid identifier can include an identifier such as the labels for grid "A" 402, grid "B" 404, grid "C" 406, grid "D" 408, grid "E" 410, and grid "F" 412 in FIG. 4. For example, the coordinates 806 can include the grid identifier "E" 410 representing available space on the topstock shelf for placement of an item.

The topstock management component 802 calculates the portion of the available flex-space 206 to be allocated to a given number of instances of a selected item 808 based on the dimensions of the available flex-space 206 and the dimensions of the selected item 808.

An item management component 810 calculates a per-item capacity 812 associated with a permanent display 814, such as, but not limited to, the permanent display area 214 in FIG. 2. The permanent display 814 is assigned to the selected item 808 during the predetermined time-period 816. The predetermined time-period 816 is a configurable amount of time, such as seven days, two weeks, one month, etc. In some examples, the predetermined time-period 816 is a user-selected future time-period.

The per-item capacity 812 is a current shelf capacity of one or more shelves assigned to the selected item 808 as permanent display space. In some examples, the permanent display space is space assigned to an item without an expiration date associated with the assigned space. The per-item capacity 812 indicates how many instances of a given item will fit into an assigned display space (maximum shelf capacity). The per-item capacity 812 includes the maximum capacity of all permanent display spaces assigned to a given item. In other words, if the selected item is a package of soap and the assigned permanent display space is a shelf holding twenty packages of the soap, the per-item capacity is twenty units of the item.

In another example, if the selected item 808 is a box of cereal and the cereal is assigned to permanent display space including a side-counter shelf capable of holding fifteen boxes of the cereal and an end-cap display capable of holding another fifteen boxes of cereal, the total per-item capacity of all the permanent display space assigned to the cereal is thirty boxes of cereal.

The calculated time-supply 820 is the amount of time the per-item capacity is predicted to last before an item-out 818 is expected to occur. The item-out 818 occurs when there are no more items left in the space assigned to an item.

In an illustrative example, if the maximum per-item capacity of all permanent display shelves is fully stocked with soap is twenty units of soap and approximately five units of soap are sold per day, the calculated time-supply 820 for the soap is four days. In another example, if the maximum per-item capacity for a box of cereal is thirty boxes and approximately six boxes of cereal are sold per day, the calculated time-supply for the cereal is five days.

A capacity prediction component 822 generates a predicted time-supply 824 of a set of permanent display areas assigned to the identified item 808 based on context data associated with the item display area and a set of per-item context-dependent demand variables 826. The time-supply in some examples is calculated based on the current modular weekly supply and expected demand for the item.

The context-dependent demand variables 826 includes one or more variables changing demand for a given item. For example, the demand variables 826 can indicate that demand for hot chocolate doubles when the temperature drops below freezing (thirty-two degrees Fahrenheit). Another variable can indicate that demand for umbrellas triples when the weather forecast predicts rain for at least two days in a row. In still another example, the context-dependent demand variables 826 indicates demand for sunscreen increases by thirty units per day when temperatures reach one-hundred degrees Fahrenheit.

The predicted capacity 828 is the amount of display space which would be necessary to hold enough units of an item to meet increased demand for a given item due to a change in context-dependent demand for the item without increasing the frequency of shelf restocking. In other words, if context-dependent demand variables indicate the demand for potato chips is expected to increase from ten units per day to thirty units per day prior to occurrence of a national sporting event, the predicted capacity 828 is the amount of shelf capacity required to hold enough units of potato chips to meet the increased demand without restocking the shelf more frequently.

The predicted number of item-outs 830 is the expected number of times the permanent display space assigned to an item will experience an item-out/require restocking during the time-period of increased demand. For example, if ice cream normally experiences an item-out once per week but demand for ice cream is expected to increase by fifty percent during the month of July, then the predicted item-outs 830 for July if additional shelf space is not allocated to ice cream can include two predicted item-outs per week for the month of July.

The capacity prediction component 822 analyzes real-time context data associated with the item display area, current transaction data associated with the selected item 808, historical transaction data associated with the selected item 808, and item data associated with the selected item 808. The capacity prediction component 822 calculates the predicted number of item-outs 830 during the predetermined future time-period based on the results of the analysis of the context data, item data and transaction data. The context data includes a news feed, a weather feed, scheduled events, and/or holidays associated with an area local to the item display area during the predetermined time-period 816.

A flex-space allocation component 832 calculates the time-supply of the items based on predicted changes in demand. In some examples, the time-supply is calculated at an item and store level. The calculated time-supply is utilized to select one or more items for placement in flex-space on the topstock shelves and/or to identify the number of instances of the item to place on the topstock shelves. The flex-space allocation component 832 assigns at least one instance of the selected item 808 to a portion of the available flex-space 834 during the predetermined time-period 816 on condition the per-item threshold minimum time-supply 836 for the selected item 808 exceeds the predicted time-supply 824. The threshold minimum time-supply 836 is a minimum amount of time between restocking shelves for the selected item 808.

The flex-space allocation component 832 in some examples assigns an expiration date 838 to the assignment 840 of the portion of flex-space 834 to the selected item 808. When the expiration date 838 occurs, the assignment 840 is canceled and any remaining instances of the selected item 808 remaining in the assigned portion of the available flex-space 834 are removed from the assigned portion of the available flex-space 834.

In some examples, the flex-space allocation component 832 assigns the portion of available flex-space 834 to the selected item 808 as a supplemental display area for a selected number of instances of the selected item 808 during the predetermined future time-period on condition the predicted number of item-outs 830 exceeds a per-item threshold number of item-outs. In this manner, the flex-space allocation component identifies accurate top stock availability and selects optimal item(s) for bringing from the backroom or other storage areas for placement in available flex-space on one or more topstock shelves.

The flex-space allocation component 832 can also identify items having insufficient permanent display capacity (limited modular space) which routinely provides insufficient time-supply of items resulting in restocking occurring too frequently. The flex-space allocation component 832 can assigns flex-space on one or more top-stock shelves to the item without an expiration date. This creates dedicated supplemental topstock space for that item to increase time-supply in the long-term and reduce the frequency of restocking from the backroom or other storage area.

Figure 9:
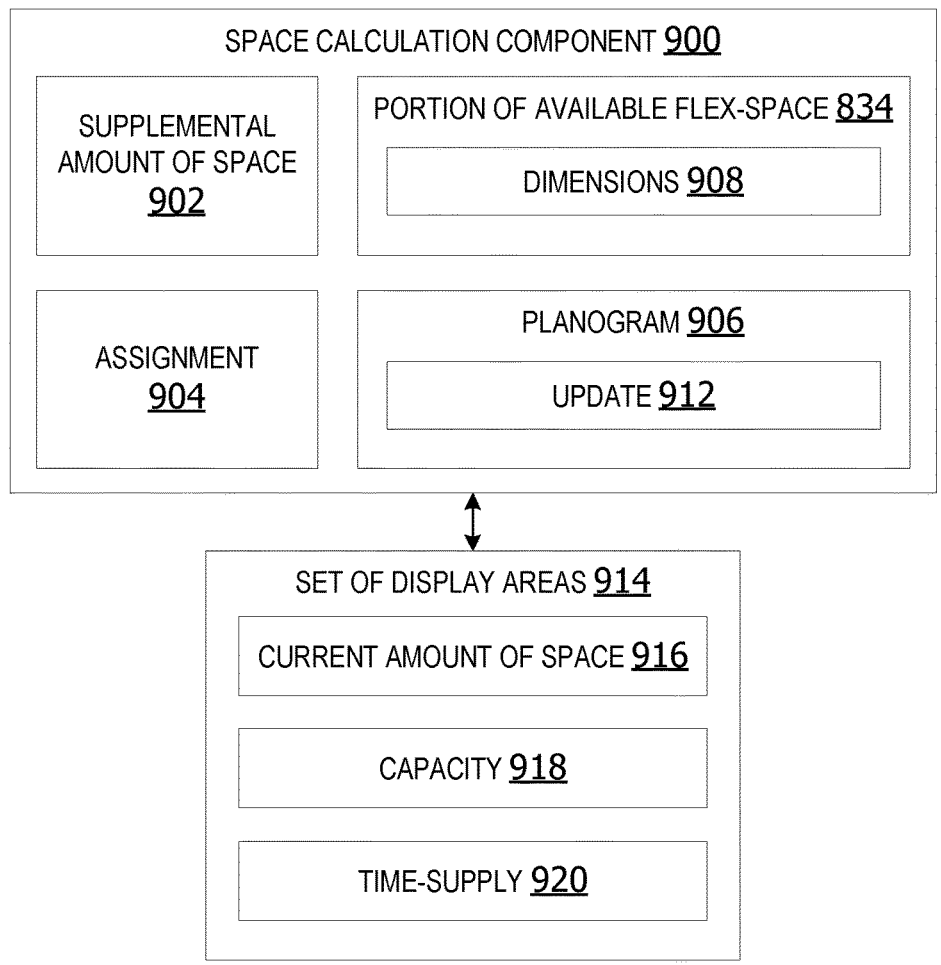
FIG. 9 is an exemplary block diagram illustrating a space calculation component.

FIG. 9 is an exemplary block diagram illustrating a space calculation component 900. The flex-space allocation component 832 in some examples includes a space calculation component, such as the space calculation component 900. The space calculation component 900 calculates a supplemental amount of space 902 for assignment 904 to an identified item. The supplemental amount of space 902 includes a difference between a predicted amount of space sufficient to provide the predicted capacity without increasing restocking of the item from the backroom or other storage area and a current amount of space 916 provided by all permanent display areas assigned to the identified item. The supplemental amount of space is sufficient to increase the current per-item capacity 918 and reduce item-outs occurring during the predetermined future time-period based on the time-supply 920 for the item.

In some examples, the space calculation component 900 analyzes a planogram 906 associated with a set of one or more item display areas 914 to determine the current amount of space 916 provided by the permanent display areas assigned to the item and/or calculate the dimensions 908 of the portion of available flex-space 834 to assign to the item as supplemental display space. The space calculation component 900 in some examples performs an update 912 of the planogram 906. The update 912 modifies the planogram 906 to reflect the assignment 904 of the portion of the available flex-space 834 to the selected time.

Figure 10:
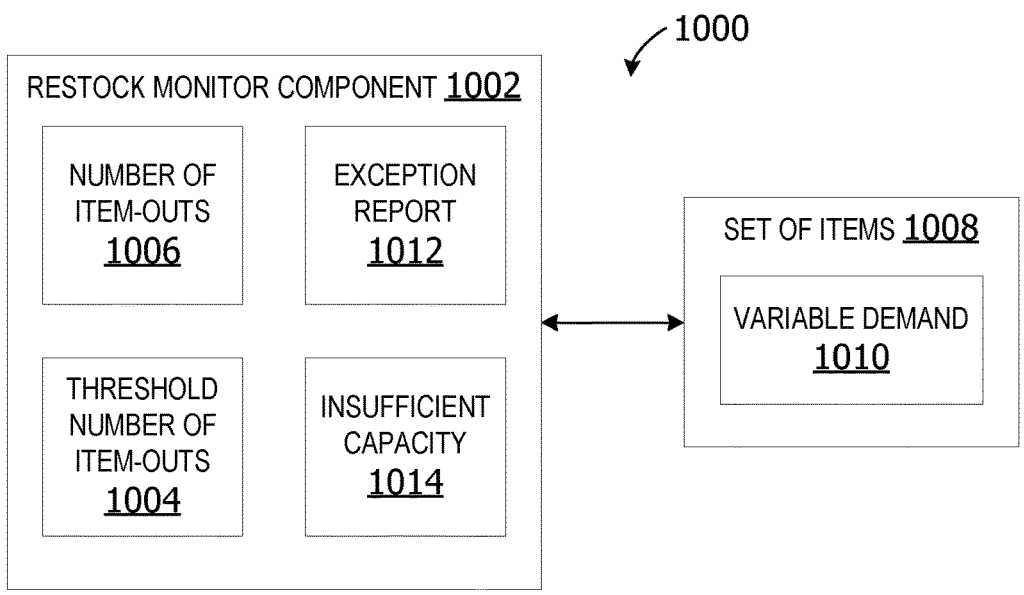
FIG. 10 is an exemplary block diagram illustrating an item monitoring component monitoring a set of display areas.

FIG. 10 is an exemplary block diagram illustrating a restock monitor component 1002 monitoring a set of display areas, such as the set of display areas 914 in FIG. 9. The restock monitor component 1002 monitors the number of item-outs 1006 associated a set of one or more items 1008 having variable demand 1010. The restock monitor component 1002 generates an exception report 1012 indicating insufficient capacity 1014 of assigned permanent display areas associated with a given item in the set of items 1008 on condition the number of item-outs 1006 for all display areas assigned to the given item exceeds a threshold number of item-outs 1004 for the given item.

Figure 11:
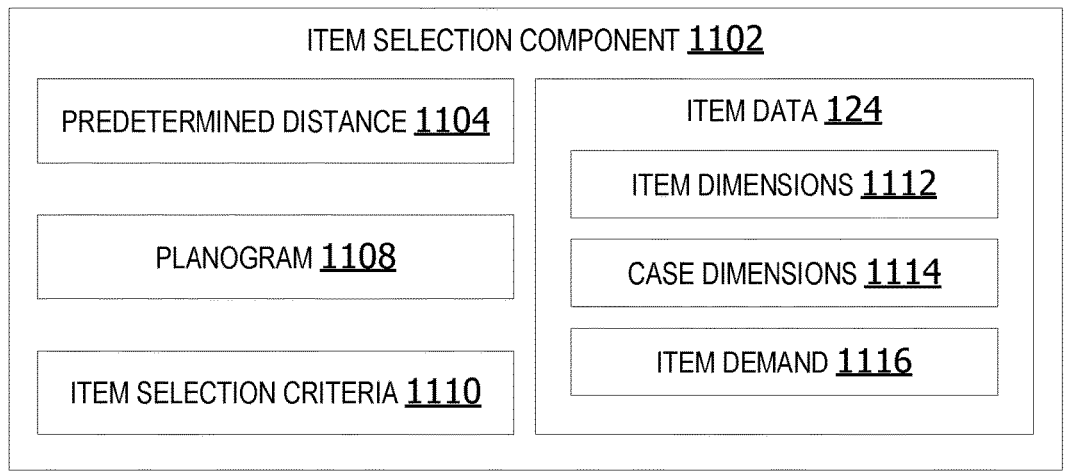
FIG. 11 is an exemplary block diagram illustrating an item selection component for selecting items suitable for assignment to available flex-space.

FIG. 11 is an exemplary block diagram illustrating an item selection component 1102 for selecting items suitable for assignment to available flex-space. The item selection component 1102 identifies an item assigned to a permanent display located within a predetermined distance 1104 from the topstock shelf based on an analysis of item data 124 and a planogram 1108 associated with the item display area using a set of item selection criteria 1110. For example, if an item is assigned to permanent display space on aisle four, additional instances of the item can be assigned to flex-space on topstock shelves on aisle three, aisle four, and aisle five, to ensure the supplemental display space is within a predetermined proximity to the permanent display location of the item.

The set of item selection criteria 1110 is a set of one or more rules for prioritizing item selection for placement in flex-space based on item attributes. In some examples, the set of item selection criteria 1110 prioritize selection of items based on sales velocity. High-velocity items are items having a high rate of sales (short time on shelves). High velocity items are typically loaded from a delivery truck to permanent display areas. Low velocity items have a low sales rate. Low velocity items are typically loaded from a delivery truck to a backroom/storage area and eventually moved from the backroom storage to the permanent display areas The item selection criteria prioritize selection of mid-velocity items for placement in flex-space on one or more topstock shelves. In this manner, the criteria prioritize selection of items anticipated to be sold within a predetermined time-period after placement on shelves or other display areas, such as, but not limited to, three to five days.

The set of item selection criteria 1110 can also include quantity of the item in the backroom or other storage area. For example, if there are four cases of a first item in the backroom and only two cases of a second item in the backroom, the criteria prioritize selection of the first item to reduce quantity in storage and increase inventory available in the item display area.

The set of item selection criteria 1110 can include time-supply. The time-supply is the amount of time between fully restocking permanent display areas and depletion/emptying of the permanent display areas. For example, the criteria can specify that items having a shorter time-supply are prioritized over items having a longer time-supply. For example, an item having a time-supply of three to five days (shelf capacity depleted in five days or less) is prioritized over an item having a time-supply of one-week.

The criteria can include a maximum time-supply or a minimum time-supply. For example, if the maximum threshold time-supply for an item quality for supplemental display space is two-weeks, an item assigned to permanent display areas holding a sixty-day time-supply of the item is disqualified from placement in flex-space. Another item assigned to permanent display space holding only a seven-day time-supply can be selected for assignment to flex-space.

Yet another item selection criterion can include a rule allocating flex-space only to items having variable sales rather than consistent sales. Consistent sales refer to items in which a substantially constant number of units of the item are sold throughout the year. Variable sales refer to items having demand that fluctuates throughout the year depending upon season, holidays, weather, events, etc.

Another criterion in the item selection criteria 1110 can include next re-supply delivery. The set of item selection criteria 1110 in these examples prioritize items having a shorter re-supply delivery time. For example, if a re-supply delivery of instances of a first item is expected in six days and a re-supply delivery for a second item is expected in two days, the second item is given higher priority for placement in flex-space on topstock shelves.

The item selection criteria 1110 can include a rule for determining whether dimensions of an item fit within dimensions of available flex-space. For example, if a case has dimensions of one cubic foot and the dimensions of the available flex-space is two cubic feet, the system determines that two cases of the item fit within the dimensions of the available flex-space, but three cases of the item would not fit.

Another criterion in the item selection criteria 1110 can include item property restrictions. The criteria can specify that items having a weight exceeding a maximum threshold weight cannot be placed on topstock shelves. For example, the maximum threshold weight can be twenty pounds. In these examples, any item weighing twenty-one pounds, or more is prohibited from placement in flex-space.

Another criterion can prohibit fragile items, such as glassware, from being placed on topstock space. Likewise, items which are top-heavy or items having an uneven base can be prohibited from storage on topstock shelves.

The item selection criteria 1110 can also restrict items from flex space which are classified as invalid items (no identifier/missing UPC), discontinued items, special items, limited-edition items, bonus quantity items, mark-down/clearance items, or other items associated with promotions. A special quantity item can include, for example, an item normally available in twelve-ounce (12 oz.) containers being offered in fourteen-ounce (14 oz.) size.

The item selection criteria 1110 can include a threshold maximum number of instances or cases of an item which can be placed in topstock flex-space. The maximum threshold number of instances of an item can include a dozen or two dozen instances of an item. The threshold maximum number of cases can include a two-case maximum for any single item. In this example, the system does not assign more than two cases of an item to the topstock shelves.

Yet another criterion for allocation of flex-space can include item stacking rules. Some items can be stacked without damaging the item while other items cannot be stacked. For example, packages of copy paper can be stacked to any height desired with any number of paper packages stacked on top of each other without damaging the packages of paper. Likewise, items of any type can be stacked on top of packages of copy paper without damaging the packages. However, if packages of copy paper are stacked on top of fragile cardboard boxes of tissue paper, the tissue paper boxes would be crushed by the weight of the paper items. Therefore, the tissue paper item can include stacking restrictions limiting stacking of items on top of the tissue boxes. Likewise, irregularly shaped items, such as individual bottles of glue, may be incapable of stacking due to the non-uniformity of their containers.

The planogram 1108 is a diagram or record of placement of items within the item display area. In some examples, the planogram 1108 provides visual representations of the locations of items or cases of items on shelves or other display areas.

The item data 124 is data describing an item. The item data 124 can include item dimensions 1112, case dimensions 1114 for a case containing multiple instances of the item, and/or item demand 1116.

Figure 12:
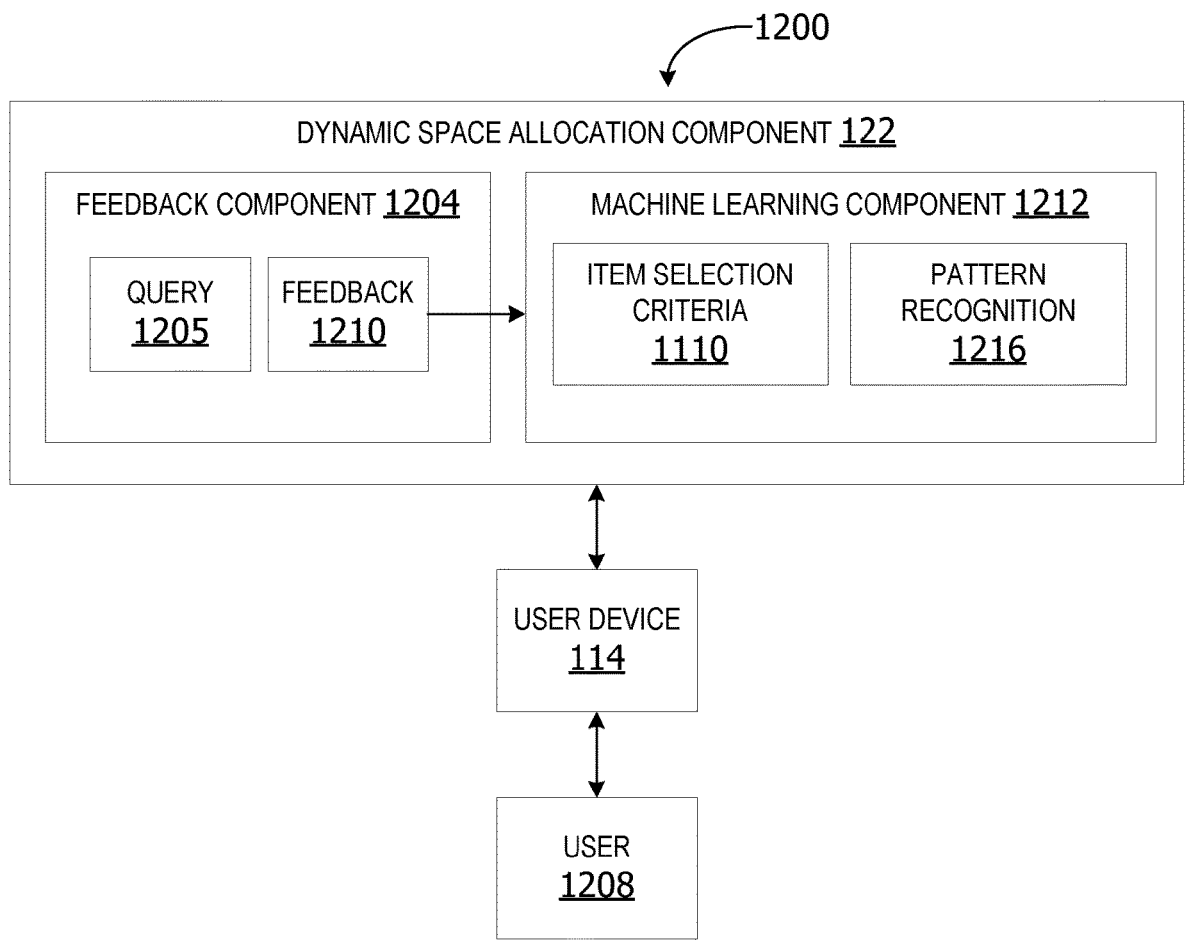
FIG. 12 is an exemplary block diagram illustrating a dynamic space allocation component including a feedback component.

FIG. 12 is an exemplary block diagram illustrating a dynamic space allocation component 122 including a feedback component 1204. The feedback component 1204 outputs a query 1205 to a user device 114 associated with at least one user 1208. The query 1205 can be sent via a communications interface, such as, but not limited to, the communications interface component 132 in FIG. 1. The query 1205 requests feedback 1210 associated with item-outs and/or restocking of items.

The feedback 1210 includes feedback indicating whether addition of supplemental display space was successful. The feedback 1210 can indicate whether item availability for consumers improved and/or whether fewer item-outs occurred. For example, if seven out-of-stocks occurred prior to allocation of flex-space and four item-outs occurred after assignment of flex-space to the item, the feedback indicates a positive reduction in item-outs and improvement of item availability in the item display area.

Feedback 1210 in other examples indicates whether the backroom/storage area is emptier (more space available for other purposes), whether items placed on topstock shelves are purchased or returned to backroom/storage area, and/or whether item sales change.

A machine learning component 1212 analyzes the feedback 1210 and other item data using pattern recognition 1216 to update item selection criteria 1110. In some examples, the machine learning component 1212 analyzes the feedback 1210 with transaction data, planogram data, restocking data, and/or inventory data to identify context-related item demand and generate the updated set of item selection criteria 1110 for more accurately identifying items to be assigned to at least a portion of at least one topstock shelf and/or calculating the number of instances of an item/case(s) of the item to place on the topstock shelf.

In some examples, the machine learning component 1212 utilizes capacity prediction variables with the feedback and pattern analysis to update the item selection criteria. The capacity prediction variables include variables, such as regional, seasonal, trends, and/or events.

The machine learning component 1212 in some examples analyzes the feedback 1210 to update/refine planograms (item placement maps), improve modular design (display area design) and micro-space allocation to items. The feedback 1210 can also be used to determine when to replenish inventory of items. In other examples, feedback from multiple different stores in two or more locations is used to refine inventory replenishment schedules, modular designs/ display area designs, and/or planograms for stores regionally or nationally.

Figure 13:
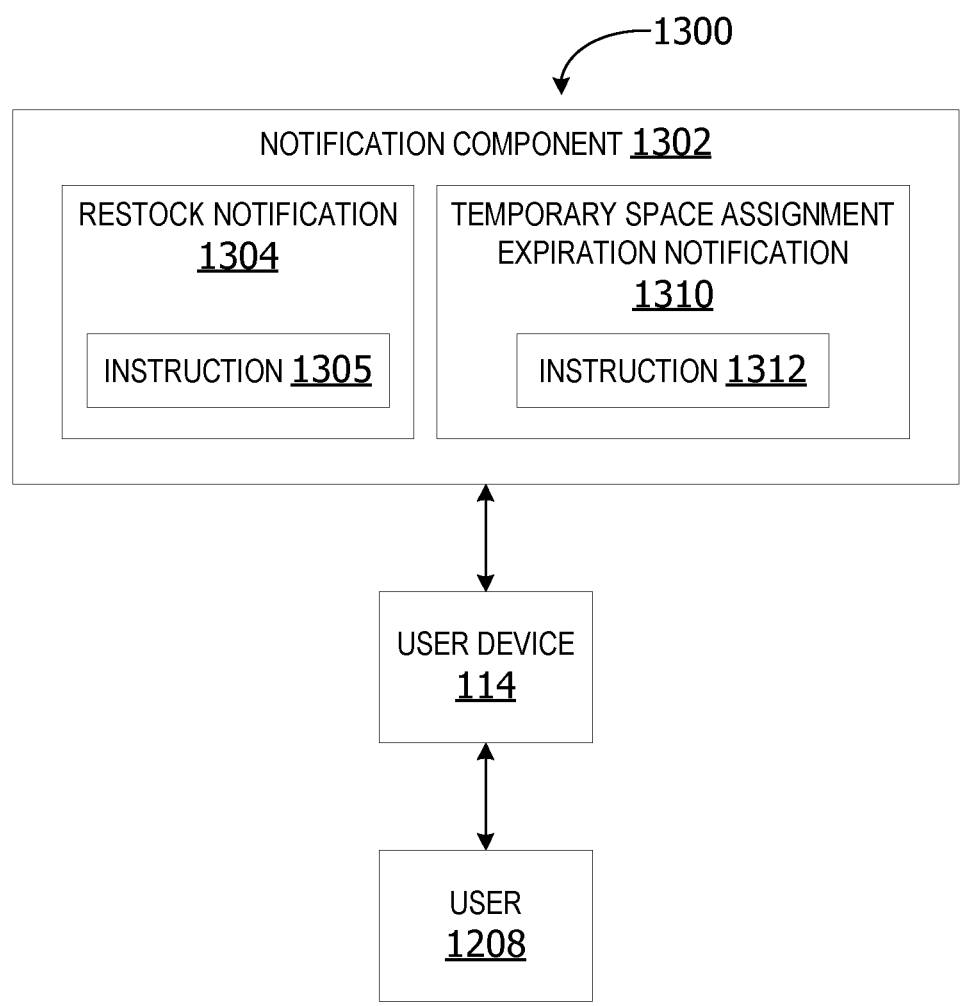
FIG. 13 is an exemplary block diagram illustrating a notification component.

FIG. 13 is an exemplary block diagram illustrating a notification component 1302. The notification component 1302 sends a restock notification 1304 to a user device 114 associated with at least one user 1208 on condition of an occurrence of an item-out associated with the selected item. The restock notification 1304 includes an instruction 1305 to move one or more instances of the item from the assigned portion of the topstock shelf to the permanent display area.

The notification component 1302 in other examples sends a temporary space assignment expiration notification 1310 to the user device 114 on an occurrence of an end of the predetermined time-period. The temporary space assignment expiration notification 1310 includes an instruction 1312 to remove any remaining instances of the item from the portion of the topstock shelf. The portion of the topstock shelf assigned to the item is designated as available flex-space upon removal of all instances of the item.

In other non-limiting examples, the notification component 1302 sends a flex-space assignment to the user device 114 on an occurrence of the number of instances of an item or case(s) of an item being assigned to available flex-space. The assignment includes an instruction identifying which items/cases to remove from storage/backroom and which topstock shelf to place the item(s)/case(s) on.

Figure 14:
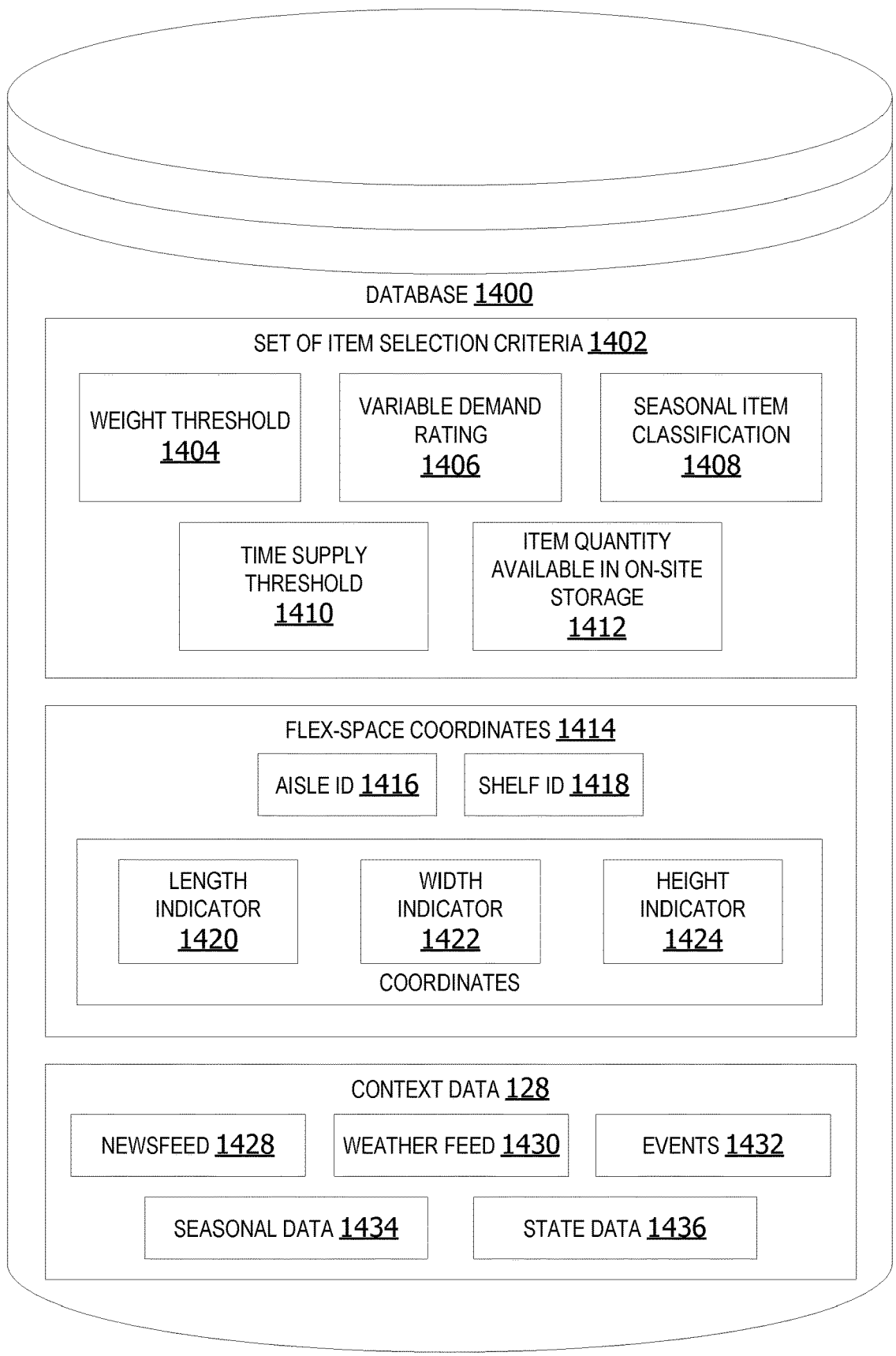
FIG. 14 is an exemplary block diagram illustrating a database.

FIG. 14 is an exemplary block diagram illustrating a database 1400 storing data associated with items having variable demand. The database 1400 can be implemented on a data storage, such as, but not limited to, the data storage device 130 in FIG. 1.

The database 1400 can include a set of item selection criteria 1402. The set of item selection criteria includes one or more criterion, such as, but not limited to, the item selection criteria 1110 in FIG. 11 and FIG. 12. The set of item selection criteria 1402 can include a weight threshold 1404, a variable demand rating 1406, seasonal item classification 1408, a time-supply threshold 1410, and item quantity available in on-site storage 1412.

The database 1400 can store flex-space coordinates 1414 for available space and/or unavailable flex-space. The flex-space coordinates 1414 can include an aisle identifier (ID) 1416, a shelf ID 1418, length indicator 1420, width indicator 1422, and/or height indicator 1424.

Context data 128 can optionally be stored on the database 1400. The context data 128 can include data obtained from a newsfeed 1428 or weather feed 1430, event 1432 data, seasonal data 1434, and/or state data 1436. The seasonal data 1434 is data associated with seasonal items and seasonal demand. The state data 1436 is data associated with state of the item display area. State data 1436 can include current temperature, current weather (snow, rain, drought), etc.

Figure 15:
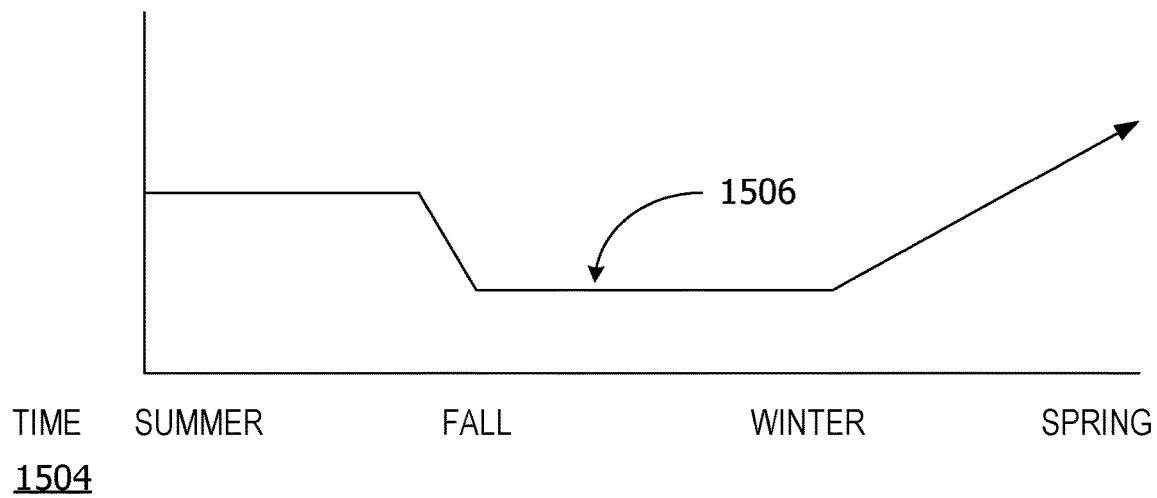
FIG. 15 is an exemplary graph illustrating variable item demand over time.

FIG. 15 is an exemplary graph 1500 illustrating variable item demand 1502 (y-axis) over time 1504 (x-axis). The graph 1500 indicates changing demand for a seasonal item over time. In this non-limiting example, the item is sunscreen. The line 1506 shows demand for the item is consistently high during summer but drops significantly during fall and winter. In the spring, demand for item begins to increase again.

Figure 16:
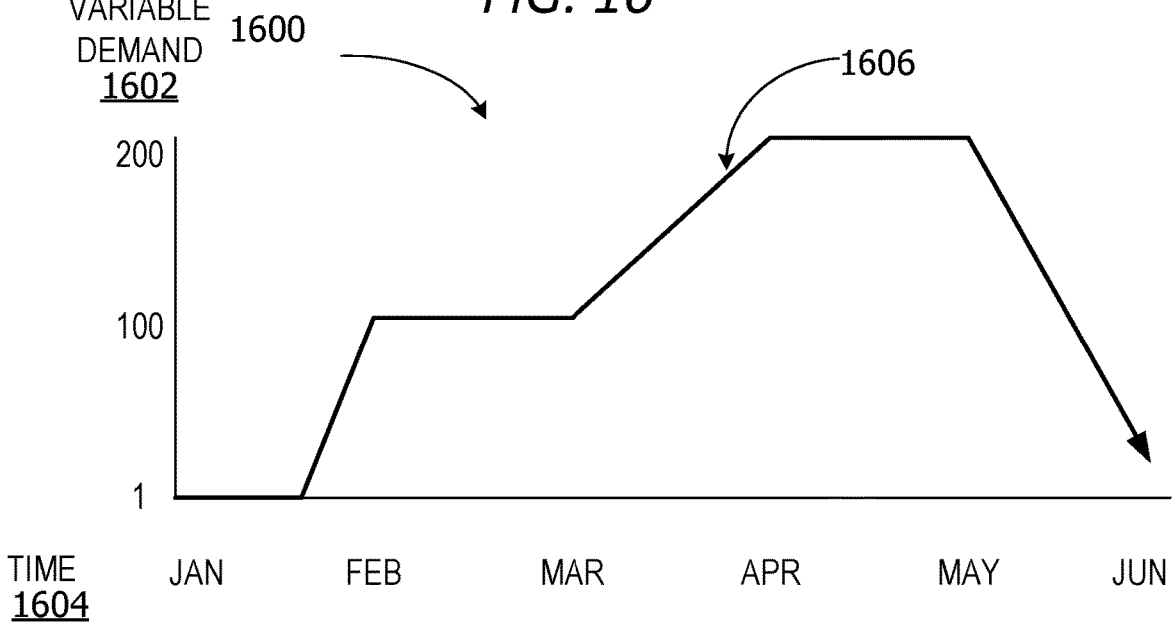
FIG. 16 is an exemplary graph illustrating item demand over time.

FIG. 16 is an exemplary graph 1600 illustrating item demand in units sold 1602 (y-axis) over time 1604 (x-axis). The item in this example is a gardening tool, such as a trowel. The line 1606 in this non-limiting example shows demand for the item is almost zero during the winter month of January. In February and March, demand for the gardening tool begins to increase. The greatest demand in this non-limiting example occurs during April and May. As summer approaches, demand begins to decrease.

Figure 17:
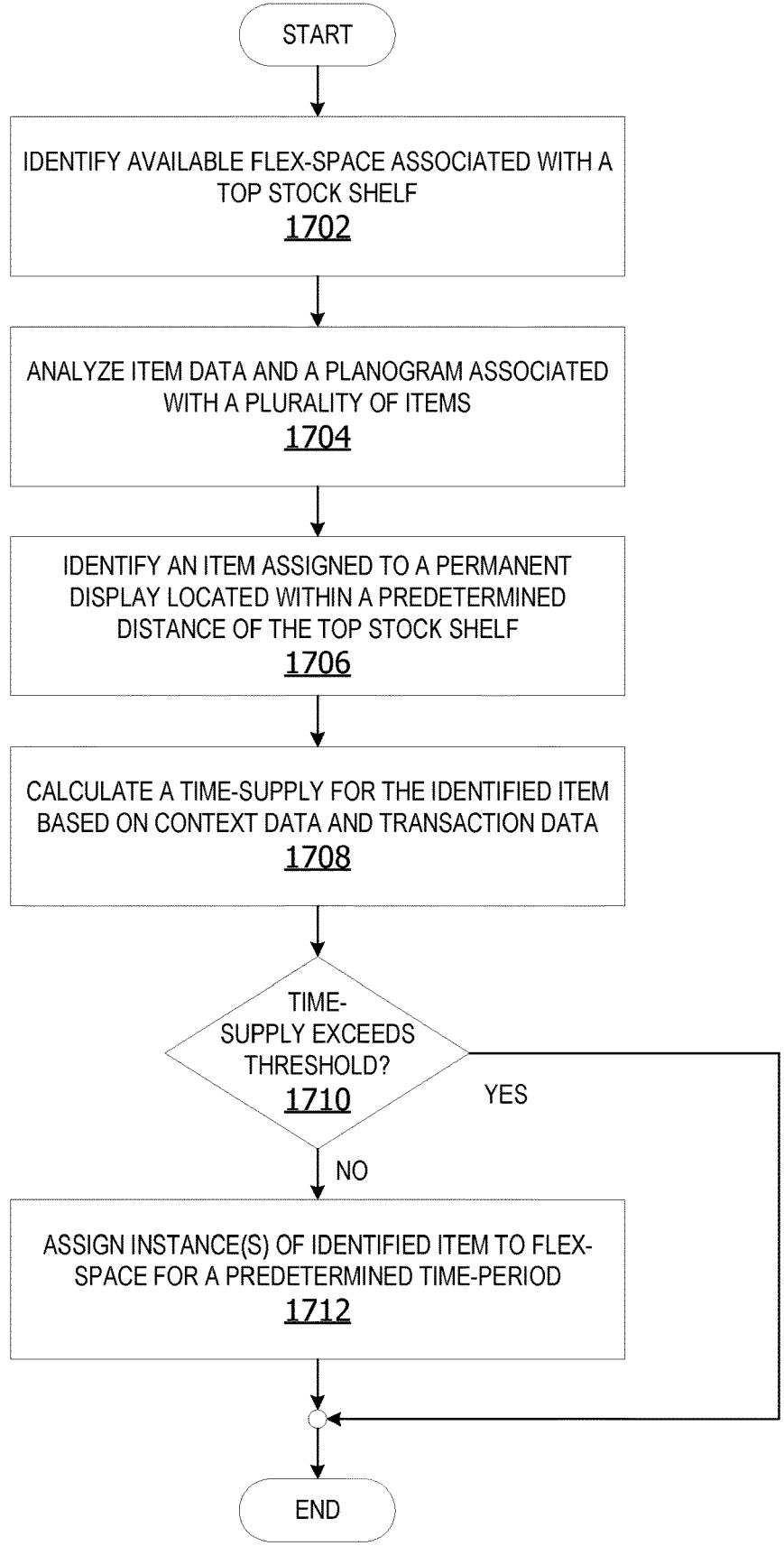
FIG. 17 an exemplary flow chart illustrating operation of the computing device to assign instances of an item to available flex-space.

FIG. 17 an exemplary flow chart illustrating operation of the computing device to assign instances of an item to available flex-space. The process shown in FIG. 17 can be performed by a dynamic space allocation component, executing on a computing device, such as the computing device 102 in FIG. 1.

The process begins by identifying available flex-space associate with a topstock shelf at 1702. A topstock shelf is highest or uppermost shelf on a set of shelves or other display, such as, but not limited to, topstock shelf 204 in FIG. 2, FIG. 3, FIG. 4, FIG. 5, FIG. 6 and/or FIG. 7.

The dynamic space allocation component analyzes item data and a planogram associated with a plurality of items at 1704. The item data is data describing properties of an item, such as size, dimensions, assigned location, case size, case dimensions, and/or weight, such as, but not limited to, the item data 124 in FIG. 1.

The dynamic space allocation component identifies an item assigned to a permanent display located within a predetermined distance of the topstock shelf is identified at 1706. The permanent display includes one or more assigned display areas assigned to an item. The permanent display can include a shelf, a refrigerated unit, a warming cabinet, a freezer display, a gondola display shelf, an end-cap display, or other display, such as, but not limited to, a permanent display area 214 in FIG. 2 and/or the set of display areas 914 in FIG. 9.

The dynamic space allocation component calculates a time-supply for the identified item based on context data and transaction data at 1708. The transaction data includes data associated with transaction data for the identified item occurring within a predetermined past time-period. The transaction data can include past sales, sales trends, or other transaction data, such as, but not limited to, the historical transaction data 126 in FIG. 1. The context data includes data associated with current conditions within the item display area and/or current events/weather, such as, but not limited to, the context data 128 in FIG. 1.

The dynamic space allocation component determines if the time-supply excess a threshold at 1710. If yes, the process terminates thereafter.

Returning to 1710, if the time-supply is less than or equal to the threshold, the dynamic space allocation component assigns one or more instance(s) of the identified item to available flex-space for a predetermined time-period at 1712. The process terminates thereafter.

While the operations illustrated in FIG. 17 are performed by a computing device, aspects of the disclosure contemplate performance of the operations by other entities. For example, a cloud service can perform one or more of the operations.

Figure 18:
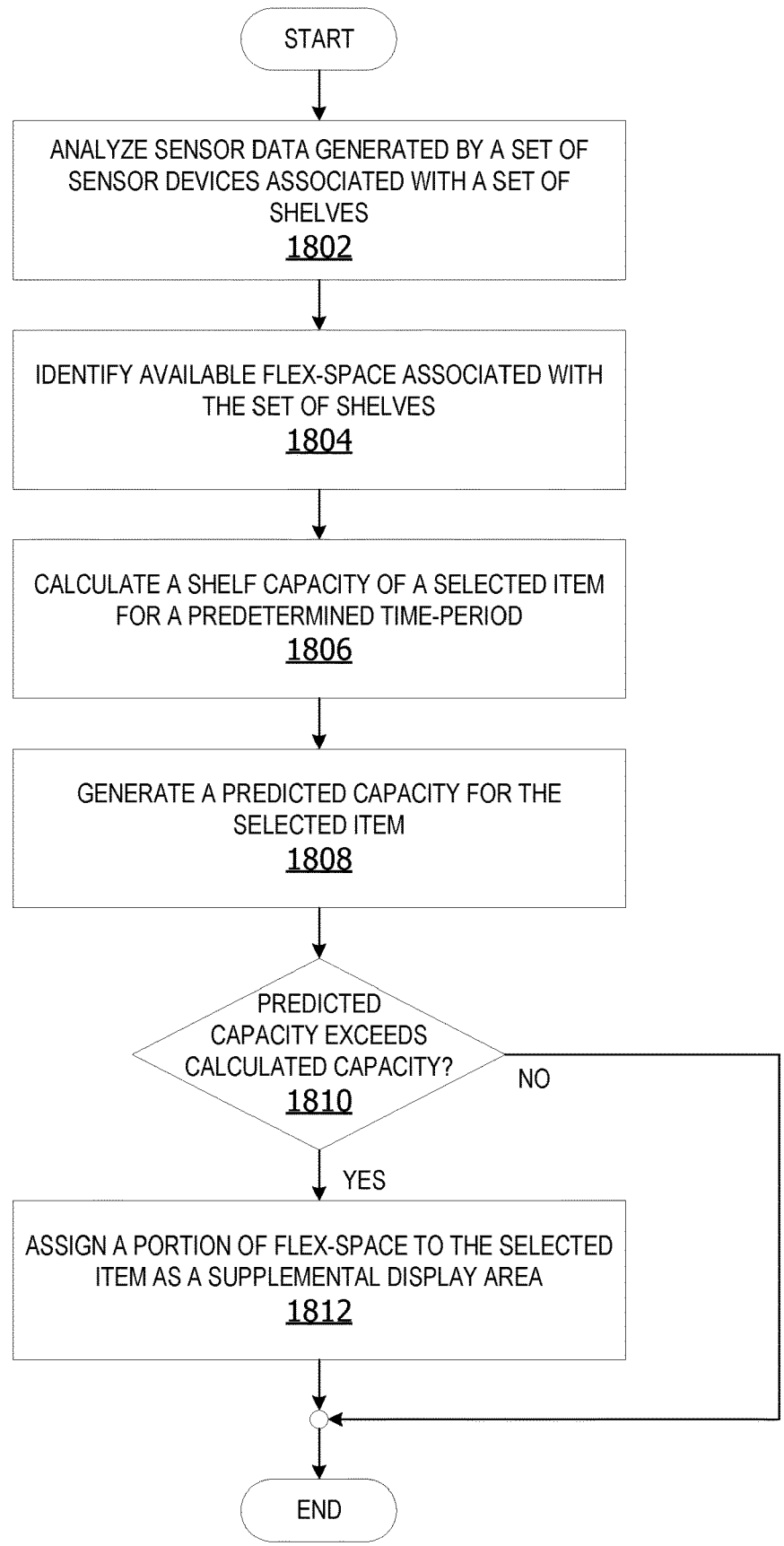
FIG. 18 an exemplary flow chart illustrating operation of the computing device to assign flex space to a selected item.

FIG. 18 an exemplary flow chart illustrating operation of the computing device to assign flex space to a selected item. The process shown in FIG. 19 can be performed by a dynamic space allocation component, executing on a computing device, such as the computing device 102 in FIG. 1.

The process begins by analyzing sensor data generated by a set of sensor devices associated with a set of shelves at 1802. The dynamic space allocation component identifies available flex-space associated with the set of shelves at 1804. The dynamic space allocation component calculates a shelf capacity of a selected item for a predetermined time-period at 1806. The dynamic space allocation component determines if a predicted capacity exceeds the calculated shelf capacity at 1810. The predicted capacity is a minimum amount of shelf capacity required to satisfy predicted demand for the predetermined time-period. If the predicted capacity of shelf space to hold enough instances of an item to meet demand is less than or equal to the calculated current shelf capacity at 1810, the process terminates thereafter.

While the operations illustrated in FIG. 18 are performed by a computing device, aspects of the disclosure contemplate performance of the operations by other entities. For example, a cloud service can perform one or more of the operations.

Figure 19:
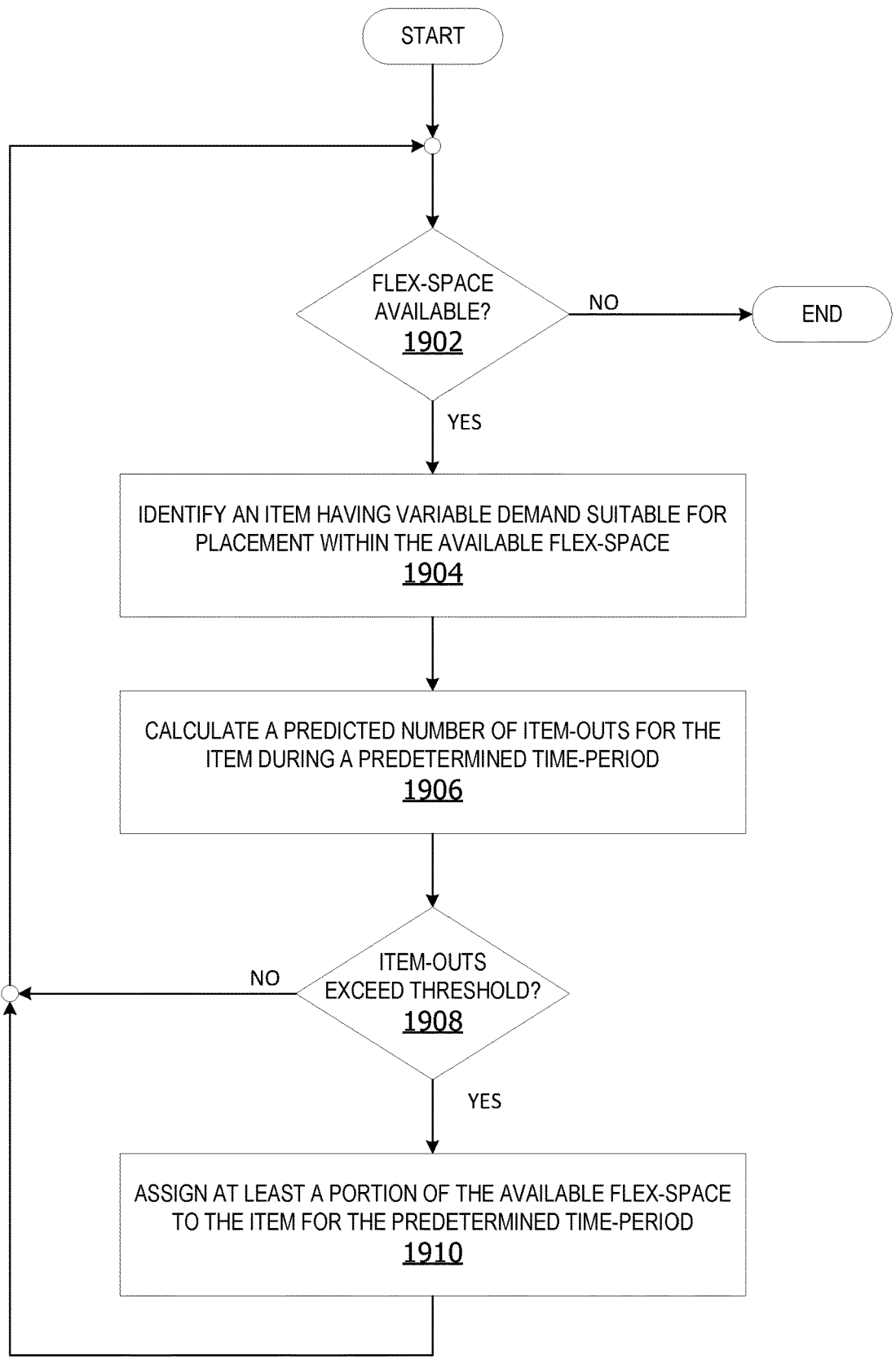
FIG. 19 an exemplary flow chart illustrating operation of the computing device to assign a portion of available flex-space to an item for a predetermined time-period.

FIG. 19 an exemplary flow chart illustrating operation of the computing device to assign a portion of available flex-space to an item for a predetermined time-period. The process shown in FIG. 19 can be performed by a dynamic space allocation component, executing on a computing device, such as the computing device 102 in FIG. 1.

The process begins by determining if flex-space is available at 1902. If yes, the dynamic space allocation component identifies an item suitable for placement within the available flex-space at 1904. The dynamic space allocation component can utilize item dimensions and/or other item data and criteria to determine whether an item is suitable for placement on the topstock shelf.

The dynamic space allocation component calculates a predicted number of item-outs for the item during a predetermined time-period at 1906. The predetermined time-period is a future time span, such as three days, five days, one-week, two-weeks, etc. In some examples, the predetermined time-period is an amount of time until a next restocking of the permanent display spaces assigned to the item.

The dynamic space allocation component determines if the item-outs exceed a threshold at 1908. If no, the process returns to 1902. The dynamic space allocation component iteratively executes operations 1902 through 1908 until there is no flex-space available. The process terminates thereafter.

Returning to 1908, if the item-outs exceed the threshold, the dynamic space allocation component assigns at least a portion of the available flex-space to the item for the predetermined time-period at 1910. The process returns to 1902. The dynamic space allocation component iteratively executes operations 1902 through 1910 until there is no flex-space available. The process terminates thereafter.

While the operations illustrated in FIG. 19 are performed by a computing device, aspects of the disclosure contemplate performance of the operations by other entities. For example, a cloud service can perform one or more of the operations.

Additional Examples

In an illustrative example, the system identifies cubic foot space available on a topstock shelf. A dynamic space allocation component optimizes storage of an item in a topstock location based on sales information for the item. The system monitors a topstock location via a sensor device and verifies placement of the item. The system identifies available space in the topstock location using video analytics, lidar, radio frequency, and/or optical sensors from a shelf backplane.

The system in other examples utilizes sensor data generated by one or more robotic sensor device to identify available temporary space and/or current location of items. In some examples, the available temporary space is identified cubic foot space on a topstock shelf.

In an example scenario, the system predicts demand for an item and predicts how long capacity of an assigned modular display for an item will last before restocking the item is necessary. If the shelf capacity is insufficient to meet predicted demand (frequency of predicted restocking is greater than a threshold) for a predetermined time-period, such as one week or two weeks, temporary space on a topstock shelf is assigned to the item. An amount of temporary space equal to the calculated additional space needed to meet the predicted demand is assigned to the item for the predicted time-period. This minimizes inventory in backroom/storage. At the expiration of the predetermined time-period, the temporary space is re-assigned to another item expected to experience a temporary increase in demand.

The system identifies available flex-space space on one or more topstock shelves using video analytics, lidar, radio frequency (RF) reflectance sensors, optical reflectance from the shelf backplane and/or an autonomous robot equipped with one or more sensor devices in another example. Items are placed on the topstock shelf left justified in and oriented with identifiers, such as UPC labels, facing out. Robotic scanners and/or other sensor devices can easily read the outward facing identifiers. In some examples, the sensor devices scan the identifiers/UPC labels at a predetermined date/time to generate sensor data, such as, but without limitation, once a day at a specific time, every twelve hours, every eight hours, and/or any other regular intervals. The system uses this sensor data associated with item identifiers to determine which items are currently stored on the topstock shelves.

In another example, integrated cameras, drones/autonomous robotic scanners and/or other sensor devices are utilized to capture data associated with the topstock shelves. This sensor data is utilized by the system to identify available flex-space on topstock shelves. The system accurately identifies the width, depth, and height from front views and top views of shelves in linear cubic feet. A database of item data, including precise dimensional info on each item, is utilized by the system to calculate which items to move from storage to topstock shelf space. This determination is made based on available space, item dimensions, items associated with the aisle(s) corresponding to that top shelf, what item is a moderate to high moving item, etc.

The video analytics of the system can also provide verification that the topstock inventory is being rotated down the shelves to permanent display areas on a regular basis. The system looks for items in the flex-space which should not be stored there. If an unassigned item is detected in the flex-space, the system sends an alert to one or more user devices associated with at least one user instructing the at least one user to remove the inappropriate item from flex-space and return it to the appropriate display area or the backroom/storage area.

In another example scenario, the system provides real-time identification of item locations on shelves, including the topstock shelves. The system can direct users to the current location of a desired item in real-time. When an item is removed from a shelf, the system automatically updates item location data, inventory data, available topstock space, and/or time-supply for the item(s).

In other examples, if a user is scanning an item-out on the permanent display while there are instances of the item available in topstock space, the system prevents the user from recording the item-out. The system can instruct the user to move instances of the item down from the topstock to the permanent display. This can improve on-hand inventory and prevent inaccurate adjustment of perpetual inventory.

In one example, entering a season for cold weather can increase sales of an item such as chili beans, where previous demand for chili beans can have been constant at two cans per day during the previous four-week time-period increases to twenty-four cans per day. If the permanent display area (side-counter) for chili beans only holds twelve cans of chili beans, an increase in items-outs and/or increase frequency of restocking is expected to occur. Therefore, the system identifies an additional number of cans for placement on topstock flex-space for the next four-weeks to meet the predicted demand increase. At the end of the four-week period, when demand returns to two-cans per day and regular display space is sufficient to meet demand, the flex-space can be reassigned to another item. This optimizes sales in placement of inventory in topstock space, where a side-counter or other assigned display space is insufficient for a limited/temporary amount of time due to seasonality, event, weather, or other context-related change in demand.

In one example, a side-counter includes a tag identifying an aisle location. The tag can be scanned to confirm the modular for an item is set as designed with items in that location placed based on modular design. The modular design can be stored in a database.

Overhead scans can be performed by ceiling mounted cameras, taller robotic scanners on a track, drones, and/or chandelier RFID tag scanners. Front scans of a shelf can be performed by a rolling floor-based robotic sensor device directed by the system as to where to go and what to scan in accordance with a schedule.

The scan data can include images of shelves/items on shelves, reflectivity data, optical scan data, etc. In still another example, a cloud data platform can provide an aggregate of all sensor data which the system retrieves as-needed or in real-time to perform sensor data analysis for topstock shelf planning.

Alternatively, or in addition to the other examples described herein, examples include any combination of the following:

the available flex-space includes dimensions of an unoccupied (open) space associated with at least a portion of a topstock shelf;

the item data includes dimensions of the selected item or dimensions of a case of the selected item, the dimensions including a length, width, and height;

calculating the portion of the available flex-space to be allocated to the number of instances of the selected item based on the dimensions of the unoccupied space and the dimensions of the selected item or the dimensions of a case of the selected item;

an item selection component analyzes item data and a planogram associated with a plurality of items within the item display area using a set of item selection criteria to identify an item within the item display area assigned to at least one permanent display located within a predetermined distance from the topstock shelf;

a machine learning component that analyzes feedback, transaction data, planogram data, restocking data, and inventory data to generate an updated set of item selection criteria;

a notification component that sends a restock notification to a user device associated with at least one user on condition of an occurrence of an item-out associated with the selected item, the restock notification comprising an instruction to move one or more instances of the item from the assigned portion of the topstock shelf to the permanent display area;

a notification component that sends a temporary space assignment expiration notification to the user device on an occurrence of an end of the predetermined time-period, the temporary space assignment expiration notification comprising an instruction to remove any remaining instances of the item from the portion of the topstock shelf wherein the portion of the topstock shelf assigned to the item is designated as available flex-space upon removal of all instances of the item;

analyzing sensor data generated by a plurality of sensor devices associated with the item display area to identify the available flex-space;

the plurality of sensor devices including at least one of a set of mobile robotic sensor devices, a set of radio frequency identification (RFID) tag readers, a set of bar code readers, a set of hand-held scanners, and a set of image capture devices;

analyzing, by a machine learning component, feedback, historical transaction data associated with the identified item, and item data using pattern recognition to generate an updated set of item selection criteria;

assigning an expiration date to the supplemental display area on the topstock shelf;

on condition of an occurrence of the expiration date, sending a notification to a user device associated with at least one user instructing the user to remove any remaining instances of the identified item from the supplemental display area;

wherein the supplemental display area is designated as available flex-space;

selecting a second item from the plurality of items within the item display area that is located within a predetermined distance from the selected topstock shelf on condition the calculated time-supply exceeds the per-item threshold minimum time-supply;

assigning flex-space to a second item on condition a per-item threshold minimum time-supply for the second item exceeds a calculated time-supply for the second item;

wherein the item selection component analyzes item data, transaction data, and inventory data using the set of item selection criteria to identify the set of items suitable for placement within the available flex-space;

the set of item selection criteria including at least one of a weight threshold, a variable demand rating, seasonal item classification, a time-supply threshold, and item quantity available in on-site storage;

the capacity prediction component that analyzes real-time context data associated with the item display area, current transaction data, historical transaction data, and item data associated with the selected item to calculate the predicted number of item-outs during the predetermined time-period and the predicted per-item time-supply;

the context data including at least one of a news feed, a weather feed, scheduled events, and holidays associated with an area local to the item display area and the predetermined time-period;

a feedback component, implemented on the at least one processor, that outputs a query to a user device associated with at least one user via the communications interface component, the query requesting feedback associated with inventory and item-outs associated with the selected item;

a machine learning component, implemented on the at least one processor, that analyzes the feedback, transaction data, planogram data, restocking data, and inventory data to identify context-related item demand and generate an updated set of item selection criteria for identifying items to be assigned to at least a portion of at least one topstock shelf;

the capacity prediction component, implemented on the at least one processor, that calculates a predicted capacity of all display areas assigned to a selected item required to satisfy predicted demand for the selected item during the predicted time-period;

a space calculation component that calculates a supplemental amount of space for assignment to the selected item;

the supplemental amount of space including a difference between a predicted amount of space sufficient to provide the predicted capacity and a current amount of space provided by all display areas assigned to the selected item, wherein the supplemental amount of space is sufficient to increase the current per-item capacity and reduce the number of item-outs occurring during the predetermined time-period;

a space allocation component that assigns the at least the portion of the available flex-space equivalent to the supplemental amount of space to the selected item and updates at least one planogram associated with the selected item to include the supplemental amount of space assigned to the selected item;

an item monitor component that monitors the number of item-outs associated with the plurality of items and generates an exception report indicating insufficient current capacity of assigned display areas associated with a given item on condition the number of item-outs for all display areas assigned to the given item exceeds the threshold number of item-outs for the given item;

wherein the flex-space allocation component assigns additional flex-space associated with at least one topstock shelf to the given item to reduce the number of item-outs;

a notification component that outputs a notification to a user device associated with a user, the notification comprising a restock notification associated with at least one permanent display area assigned to the selected item and an instruction to move one or more instances of the selected item from the supplemental display area to the permanent display area;

wherein the plurality of sensor devices includes at least one of a set of mobile robotic sensor devices, a set of radio frequency identification (RFID) tag readers, a set of bar code readers, a set of hand-held scanners, a set of image capture devices, and a set of pressure sensors;

the topstock management component, implemented on the at least one processor, that generates coordinates for flex-space associated with a topstock shelf assigned to the selected item; and/or the coordinates including an aisle identifier, a shelf identifier, a length indicator, a width indicator, and a height indicator defining a three-dimensional space for placement of a set of items or a set of cases of items assigned to the flex-space.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14.

In some examples, the operations illustrated in FIG. 17, FIG. 18 and FIG. 19 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH™" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media.

Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for dynamic allocation of temporary display space based on predicted item time-supply. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, such as when encoded to perform the operations illustrated in FIG. 17, FIG. 18 and FIG. 19 constitute exemplary means for analyzing sensor data generated by a plurality of sensor devices; exemplary means for identifying available flex-space associated with at least one topstock shelf within the item display area based on the analysis of the sensor data; exemplary means for calculating a per-item capacity associated with a permanent display area assigned to a selected item having variable demand during a predetermined time-period; exemplary means for calculating a predicted per-item capacity associated with the selected item during the predetermined time-period based on item data, historical transaction data, and context data associated with the item display area; and exemplary means for assigning a portion of the available flex-space to the selected item as a supplemental display area for a number of instances of the selected item during the predetermined time-period on condition the predicted per-item capacity exceeds the calculated per-item capacity.

In another example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, such as when encoded to perform the operations illustrated in FIG. 17, FIG. 18 and FIG. 19, constitute exemplary means for identifying available flex-space for a selected topstock shelf within an item display area; constitute exemplary means for analyzing item data and a planogram associated with a plurality of items within the item display area using a set of item selection criteria; constitute exemplary means for identifying an item within the item display area assigned to at least one permanent display located within a predetermined distance from the topstock shelf; constitute exemplary means for calculating a time-supply for the identified item based on context data associated with the item display area and transaction data associated with the identified item; and constitute exemplary means for assigning a given number of instances of the identified item to the flex-space for a predetermined time-period on condition a per-item threshold minimum time-supply for the identified item exceeds the calculated time-supply.

In yet another example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, such as when encoded to perform the operations illustrated in FIG. 17, FIG. 18 and FIG. 19, constitute exemplary means for analyzing sensor data generated by the plurality of sensor devices; constitute exemplary means for identifying available flex-space associated with at least one topstock shelf within the item display area based on the analysis of the sensor data, the available flex-space comprising a length, width, and height dimensions of an open space associated with a topstock shelf; constitute exemplary means for identifying a set of items from a plurality of items within the item display area suitable for placement within the available flex-space based on dimensions of each item in the set of items and a location of a at least one permanent display area assigned to each item in the set of items, each item in the set of items is an item having variable demand and assigned to a permanent display area located within a predetermined distance of the available flex-space; constitute exemplary means for calculating a predicted number of item-outs associated with each item in the set of items during a predetermined time-period using per-item current capacity of the assigned permanent display area and a predicted per-item time-supply for each item, an item-out including an absence of items available on the assigned permanent display area triggering a restock of the selected item; and constitute exemplary means for selecting an item from the set of items having the predicted number of item-outs exceeding a threshold number of item-outs and assigns at least a portion of the available flex-space to the selected item as a supplemental display area for a number of instances of the selected item.

Other non-limiting examples provide one or more computer storage devices having a first computer-executable instructions stored thereon for providing dynamic allocation of flex-space to variable demand items. When executed by a computer, the computer performs operations including identifying available flex-space for a selected topstock shelf within an item display area; analyzing item data and a planogram associated with a plurality of items within the item display area using a set of item selection criteria to identify an item within the item display area assigned to at least one permanent display located within a predetermined distance from the selected topstock shelf; calculating a time-supply for the identified item based on context data associated with the item display area and transaction data associated with the identified item; and assigning at least one instance of the identified item to the flex-space for a predetermined time-period on condition a per-item threshold minimum time-supply for the identified item exceeds the calculated time-supply.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for dynamic allocation of items to temporary display space, the system comprising:
   a memory;
   at least one processor communicatively coupled to the memory;
   a plurality of sensor devices within an item display area;
   a topstock management component, implemented on the at least one processor, that identifies available flex-space associated with at least one topstock shelf within the item display area based on an analysis of sensor data generated by the plurality of sensor devices, wherein the at least one topstock shelf is out-of-reach to a user without assistance;
   an item management component, implemented on the at least one processor, that calculates a per-item capacity associated with a permanent display area assigned to a selected item having variable demand during a predetermined time-period;
   a capacity prediction component, implemented on the at least one processor, that calculates a predicted time-supply for the per-item capacity associated with the selected item during the predetermined time-period based on item data, historical transaction data, and context data associated with the item display area, wherein the predicted time-supply is the amount of time the per-item capacity is predicted to last before there is an item-out for the selected item in the assigned permanent display area; and
   a flex-space allocation component, implemented on the at least one processor, that assigns a portion of the available flex-space to the selected item as a supplemental storage area for a number of instances of the selected item during the predetermined time-period on condition a per-item threshold minimum time-supply for the selected item exceeds the predicted time-supply for the per-item capacity.

2. The system of claim 1, wherein the available flex-space comprises dimensions of unoccupied space associated with at least a portion of a topstock shelf that is out-of-reach to the user without assistance, and wherein the item data comprises dimensions of the selected item, and dimensions of a case of the selected item, the dimensions comprising a length, width, and height, and further comprising:
   a space calculation component, implemented on the at least one processor, that calculates the portion of the available flex-space to be allocated to the number of instances of the selected item based on the dimensions of the open space and the dimensions of the selected item or the dimensions of the case of the selected item.

3. The system of claim 1, further comprising:
   an item selection component, implemented on the at least one processor, that identifies an item within the item display area assigned to at least one permanent display located within a predetermined distance from the at least one topstock shelf based on an analysis of item data and a planogram associated with a plurality of items within the item display area using a set of item selection criteria.

4. The system of claim 1, further comprising:
   a machine learning component, implemented on the at least one processor, that analyzes feedback, transaction data, planogram data, restocking data, and inventory data to generate an updated set of item selection criteria.

5. The system of claim 1, further comprising:
   a notification component, implemented on the at least one processor, that sends a restock notification to a user device associated with at least one user on condition of an occurrence of an item-out associated with the selected item, the restock notification comprising an instruction to move one or more instances of the item from a portion of the at least one topstock shelf that is out-of-reach to the user without assistance to the assigned permanent display area.

6. The system of claim 1, further comprising:
   a notification component, implemented on the at least one processor, that sends a temporary space assignment expiration notification to a user device on an occurrence of an end of the predetermined time-period, the temporary space assignment expiration notification comprising an instruction to remove any remaining instances of the item from a portion of the at least one topstock shelf that is out-of-reach to the user without assistance, wherein the portion of the at least one topstock shelf assigned to the item is designated as the available flex-space upon removal of all instances of the item.

* * * * *